United States Patent
Kawakami et al.

(10) Patent No.: US 6,939,975 B2
(45) Date of Patent: Sep. 6, 2005

(54) CYANINE DYES

(75) Inventors: Masayuki Kawakami, Kanagawa (JP); Hiroshi Kitaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/344,273

(22) PCT Filed: Aug. 3, 2001

(86) PCT No.: PCT/JP01/06689
§ 371 (c)(1),
(2), (4) Date: Sep. 10, 2003

(87) PCT Pub. No.: WO02/12398
PCT Pub. Date: Feb. 14, 2002

(65) Prior Publication Data
US 2004/0054192 A1 Mar. 18, 2004

(30) Foreign Application Priority Data

| Aug. 8, 2000 | (JP) | 2000-240144 |
| Aug. 8, 2000 | (JP) | 2000-240145 |
| Oct. 30, 2000 | (JP) | 2000-331018 |
| Mar. 26, 2001 | (JP) | 2001-087914 |

(51) Int. Cl.$^7$ ............................................. C09B 23/08
(52) U.S. Cl. ................................................... 548/455
(58) Field of Search ........................................ 548/455

(56) References Cited

U.S. PATENT DOCUMENTS 4,839,265 A  6/1989 Ohno et al.

FOREIGN PATENT DOCUMENTS

| DE | 19957007 | 5/2001 |
| EP | 0 342 939 A | 11/1989 |
| EP | 0 428 112 A1 | 5/1991 |
| EP | 0 445 627 A1 | 9/1991 |
| EP | 0 678 778 A | 10/1995 |
| JP | 4-358143 | 12/1992 |
| JP | 5-307233 | 11/1993 |
| JP | 6-95282 | 4/1994 |
| JP | 6-316674 | 11/1994 |
| JP | 10-195319 | 7/1998 |
| JP | 2000-94836 | 4/2000 |
| JP | 2000292758 | * 10/2000 |

OTHER PUBLICATIONS

Chudinova et al., Chemical Abstracts, 129:142315, 1998.*

* cited by examiner

Primary Examiner—Fiona T. Powers
(74) Attorney, Agent, or Firm—Sughrue Mion, PLLC

(57) ABSTRACT

A compound represented by the following formula (I) or a salt thereof:

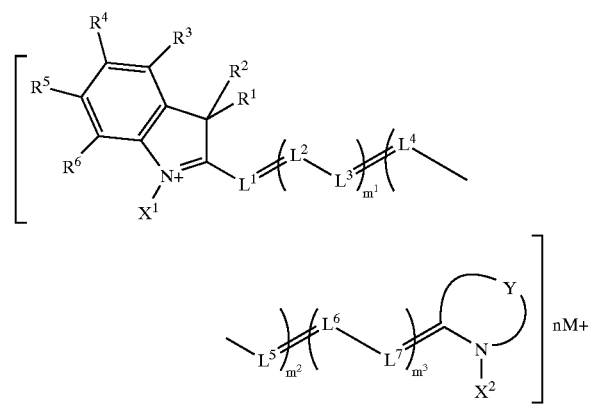

wherein $R^1$ and $R^2$ represent an alkyl group or an aryl group; $R^3$ to $R^6$ represent hydrogen atom, an alkyl group, an aryl group, a heteroaryl group, a halogen atom, cyano group, carboxyl group or sulfo group; $X^1$ and $X^2$ represent an alkyl group having 1 to 15 carbon atoms or an aryl group, and the total number of carboxyl groups existing in $X^1$ and $X^2$ is 4 or less; $m^1$ to $m^3$ represents 0 or 1; $L^1$ to $L^7$ represent a methine group; M represents hydrogen atom, a metal or a quaternary ammonium salt; Y represents nonmetallic elements required to form a 5- to 10-membered heterocyclic ring; and n represents an integer of 1 to 7 required to neutralize charge, which is useful for manufacture of silver halide photographic light-sensitive materials.

9 Claims, No Drawings

CYANINE DYES

TECHNICAL FIELD

The present invention relates to cyanines which have four or less carboxyl groups on the 1-position of an indolenine ring, and also to cyanines which have an aryl group or a heteroaryl group on an indolenine ring.

BACKGROUND ART

In silver halide photographic light-sensitive materials, photosensitive emulsion layers or other layers are often colored for the purpose of absorbing a light of specific wavelength. When it is required to control spectral composition of a light that should enter into a photosensitive emulsion layer, a colored layer is provided at a position remoter from a support than the photosensitive emulsion layer on a photographic light-sensitive material. Such a colored layer is called a filter layer. With the purpose of preventing blur of images, which is caused by reentry of a light scattered when or after it passes through a photosensitive emulsion layer and reflected by an interface between the emulsion layer and a support or a surface of the photosensitive material opposite to the emulsion layer side into the photosensitive emulsion layer, i.e., halation, a colored layer is provided between the photosensitive emulsion layer and the support or on a surface opposite to the photosensitive emulsion layer and the support. Such a colored layer is called antihalation layer. When a multilayer color light-sensitive material is prepared, an antihalation layer may sometimes be provided between the layers. In order to prevent decline of sharpness of images due to light scattering in the photosensitive emulsion layer (this phenomenon is generally called irradiation), the photosensitive emulsion layer may also be colored.

These layers to be colored often consist of hydrophilic colloid, and therefore a water-soluble dye is usually added to the layers for such coloration. Such a dye needs to satisfy the following requirements.
(1) The dye has appropriate spectral absorption depending on a purpose of use.
(2) The day is inactive in terms of photographic chemistry. That is, the dye should not give undesired effects on performances of silver halide photographic light-sensitive materials in a chemical sense, for example, decline of sensitivity, regression of latent image or fog.
(3) The dye is decolorized or removed by dissolution during photographic processes so that it should not leave detrimental coloration on photographic light-sensitive materials after processing.
(4) The dye has superior stability against aging in a solution or a photographic material.

As dyes satisfying these requirements, many kinds of dyes which absorb a visible light or ultraviolet light have been known so far. These dyes are suitable for a purpose of improvement of images in conventional photographic elements sensitized for a wavelength of 700 nm or less. In particular, triarylmethane and oxonol dyes are widely used in relation to the purpose.

It has been desired to develop an antihalation dye or anti-irradiation dye which achieves absorption in an infrared region of spectrum, which is for photographic light-sensitive materials as recently developed recording materials sensitized for infrared wavelengths, e.g., materials for recording outputs of near-infrared lasers. As one of light exposure methods of such photographic light-sensitive materials, for example, so-called scanner type image formation method is known in which an original is scanned, and a photographic light-sensitive material is exposed based on the obtained image signal to form a negative or positive image corresponding to image of the original. In this method, semiconductor lasers are most preferably used as light sources for the scanner type recording method. The semiconductor lasers are small and inexpensive as well as enable easy modulation, and they have a longer lifetime compared with other He—Ne lasers, argon lasers and the like and emit a light in an infrared region. The lasers have an advantage in that, when a photosensitive material having sensitivity in an infrared region is used, a bright safe light can be used, and thus workability for handling is improved.

However, no suitable dye is available which has absorption in an infrared region of spectrum so as to satisfy the aforementioned requirements (1), (2), (3) and (4), in particular, requirements (2) and (3). Therefore, only a few light-sensitive materials having high photosensitivity for an infrared region are available in which halation and irradiation are prevented. Accordingly, at present, the characteristics of the semiconductor lasers having such superior performances as described above cannot fully utilized.

As state of the art concerning cyanines having two carboxyl groups in the 1-position of the indolenine ring, Japanese Patent Laid-open Publication (Kokai) No. (Sho) 63-144344 discloses cyanine dyes having two carboxylalkyl groups. However, any cyanine dyes containing an indolenine structure have not been known so far.

As state of the art concerning cyanines having a carboxyl group on the 1-position of the indolenine ring, U.S. Pat. No. 6,002,003 discloses sulfoindolenine cyanine dyes having a carboxyalkyl group. However, the compounds are limited to those wherein the methine group is unsubstituted, and no sulfoindolenine cyanine dye is known which has a substituent on the methine group.

Further, as the art concerning cyanines having an aryl group or a heteroaryl group on the indolenine ring, U.S. Pat. No. 6,004,536 discloses cyanine dyes having a phenyl group, a sulfophenyl group and the like. However, in the cyanine dyes, the substituent on the nitrogen atom at the 1-position is limited to a hydrocarbon group having 7 to 30 carbon atoms, and the patent document fails to disclose any cyanine dyes having a substituent containing 6 or less carbon atoms, in particular, sulfo group and the like, at the 1-position. Moreover, specific examples disclosed in the patent document are limited only to trimethine and pentamethine cyanine dyes, and any heptamethine cyanine dyes having an aryl group or heteroaryl group are not disclosed.

DISCLOSURE OF THE INVENTION

An object of the present invention is to provide a dye satisfying the aforementioned requirements (1), (2), (3) and (4). More specifically, the object of the present invention is to provide a novel cyanine dye which does not adversely effect photographic properties of photosensitive emulsion and is useful as an infrared-sensitive dye having reduced residual color after development. Another object of the present invention is to provide a silver halide photographic light-sensitive material containing such a compound.

The inventors of the present invention conducted various researches to achieve the aforementioned objects. As a result, they found that compounds represented by the following formula (I) or (II) and salts thereof had the aforementioned characteristics and were useful for producing silver halide photographic light-sensitive materials. The present invention was achieved on the basis of the findings.

The present invention thus provides compounds represented by the following formula (I) or salts thereof.

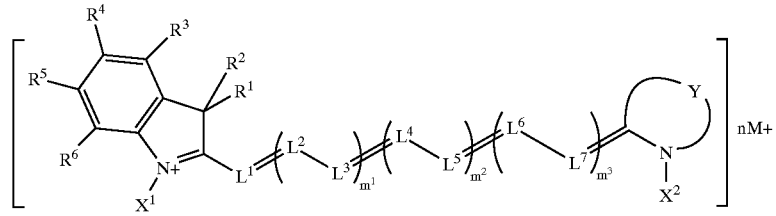

In the formula, $R^1$ and $R^2$ each independently represent a substituted or unsubstituted alkyl group having 1 to 10 carbon atoms or a substituted or unsubstituted aryl group, and $R^1$ and $R^2$ may bind to each other to form a ring; $R^3$, $R^4$, $R^5$ and $R^6$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group, or sulfo group, and two of adjacent groups selected from the group consisting of $R^3$, $R^4$, $R^5$ and $R^6$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is 4 or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$ and $R^6$ represents a substituted or unsubstituted aryl group or a substituted or unsubstituted heteroaryl group; $m^1$ represents 0 or 1; $m^2$ represents 0 or 1; $m^3$ represents 0 or 1; $L^1$, $L^2$, $L^3$, $L^4$, $L^5$, $L^6$ and $L^7$ each independently represent a substituted or unsubstituted methine group, and when two or more methine groups among said methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ represents a substituted methine group, and $R^4$ represents sulfo group; M represents hydrogen atom, a metal or a quaternary ammonium salt; Y represents nonmetallic elements required to form a 5- to 10-membered heterocyclic ring (said heterocyclic ring may be a condensed ring); and n represents an integer of from 1 to 7 required to neutralize charge.

According to a preferred embodiment of the invention, $m^1$, $m^2$ and $m^3$ all represent 1, and it is more preferred that $X^1$ is a group represented by the following formula (i).

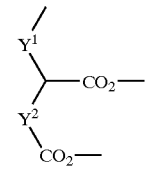

In the formula, $Y^1$ and $Y^2$ each independently represent a substituted or unsubstituted divalent bridging group.

According to another preferred embodiment, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$ and $R^6$ represents a substituted or unsubstituted aryl group or a substituted or unsubstituted heteroaryl group. It is also preferred that the total number of carboxyl groups existing in $X^1$ and $X^2$ is 0 or 1.

As preferred compounds and salts thereof encompassed within the compounds represented by the aforementioned formula (I) and salts thereof, compounds represented by the following formula (II) and salts thereof are provided.

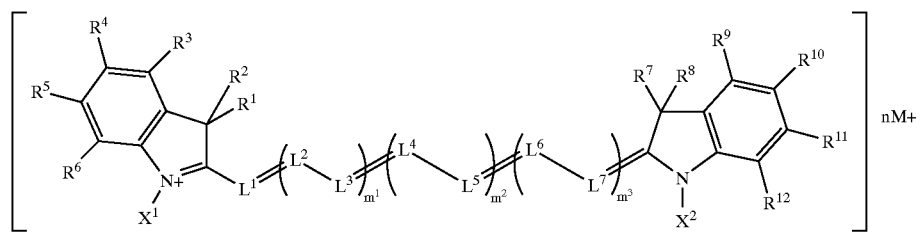

In the formula, $R^1$, $R^2$, $R^7$ and $R^8$ each independently represent a substituted or unsubstituted alkyl group having 1 to 10 carbon atoms or a substituted or unsubstituted aryl group, and $R^1$ and $R^2$ and/or $R^7$ and $R^8$ may bind to each other to form a ring; $R^3$, $R^4$, $R^5$, $R^6$, $R^9$, $R^{10}$, $R^{11}$ and $R^{12}$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and $R^3$, $R^4$, $R^5$, $R^6$, $R^9$, $R^{10}$, $R^{11}$ and $R^{12}$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$, $R^6$, $R^9$, $R^{10}$, $R^{11}$ and $R^{12}$ represents a substituted or unsubstituted aryl group or a substituted or unsubstituted heteroaryl group; $m^1$ represents 0 or 1; $m^2$ represents 0 or 1; $m^3$ represents 0 or 1; $L^1$, $L^2$, $L^3$, $L^4$, $L^5$, $L^6$ and $L^7$ each independently represent a substituted or unsubstituted methine group, and when two or more methine groups among said methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ is a substituted methine group, and $R^4$ and $R^{10}$ represents sulfo group; M represents hydrogen atom, a metal or a quaternary ammonium salt; and n represents an integer of 1 to 7 required to neutralize charge.

According to a preferred embodiment of the invention, $m^1$, $m^2$ and $m^3$ all represent 1, and $X^1$ is a group represented by the following formula (i).

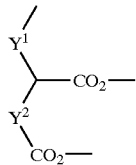

In the formula, $Y^1$ and $Y^2$ each independently represent a substituted or unsubstituted divalent bridging group.

According to a more preferred embodiment, $X^1$ and $X^2$ each independently represent a group represented by the following formula (i).

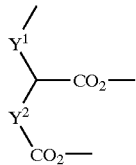

In the formula, $Y^1$ and $Y^2$ each independently represent a substituted or unsubstituted divalent bridging group.

Further, according to another preferred embodiment, it is preferred that $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$, $R^6$, $R^9$, $R^{10}$, $R^{11}$ and $R^{12}$ represents a substituted or unsubstituted aryl group or a substituted or unsubstituted heteroaryl group. Moreover, it is also preferred that the total number of carboxyl groups existing in $X^1$ and $X^2$ is 0 or 1.

According to another preferred embodiment of the formula (II), $X^1$ and $X^2$ each independently represent a group represented by the following formula:

wherein $Y^3$ represents a hydrocarbon group having 1 to 10 carbon atoms, at least one methine group selected from the group consisting of $L^1$, $L^2$, $L^3$, $L^4$, $L^5$, $L^6$ and $L^7$ is a substituted methine group, and $R^4$ and $R^{10}$ represent sulfo group.

From another aspect, the present invention provides a silver halide photographic light-sensitive material containing a compound selected from the group consisting of the compounds represented by the formula (I) and the compounds represented by the formula (II) or a salt thereof. The present invention also provides use of a compound selected from the group consisting of the compounds represented by the formula (I) and the compounds represented by the formula (II) or a salt thereof for manufacture of a silver halide photographic light-sensitive material.

BEST MODE FOR CARRYING OUT THE INVENTION

The alkyl group having 1 to 10 carbon atoms represented by $R^1$, $R^2$, $R^7$ or $R^8$ may be straight, branched, cyclic, or a combination thereof (in the specification, alkyl groups and alkyl moieties of substituents containing the alkyl moieties have the same meaning, unless otherwise specifically mentioned). Examples of the unsubstituted alkyl group include, for example, methyl group, ethyl group, propyl group, butyl group, hexyl group and the like. Number, type and substituting position of the substituent existing on the substituted alkyl group are not particularly limited. Examples of the substituted alkyl group include, for example, a sulfoalkyl group, a carboxylalkyl group, a hydroxyalkyl group, an alkoxyalkyl group, an aminoalkyl group, a halogenoalkyl group, a cyanoalkyl group, an aryl-substituted alkyl group, a heteroaryl-substituted alkyl group and the like.

The aryl group represented by $R^1$, $R^2$, $R^7$ or $R^8$ may be either a monocyclic aryl group or a condensed-ring aryl group, and 6- to 14-membered aryl groups, preferably 6- to 10-membered aryl groups can be used (in the present specification, aryl groups and aryl moieties of substituents containing the aryl moieties have the same meaning, unless otherwise specifically mentioned). The aryl group is preferably a phenyl group or a naphthyl group, more preferably a phenyl group. Examples of the substituted aryl group include a sulfophenyl group, a hydroxyphenyl group and an aminophenyl group.

$R^1$ and $R^2$, or $R^7$ and $R^8$ may bind to each other to form a ring. Examples of the ring formed include, for example, cyclopentyl ring, cyclohexyl ring and the like. $R^1$, $R^2$, $R^7$ and $R^8$ preferably represent methyl group or ethyl group, more preferably methyl group.

$R^3$, $R^4$, $R^5$, $R^6$, $R^9$, $R^{10}$, $R^{11}$ and $R^{12}$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group, or sulfo group, and two adjacent groups selected from the group consisting of $R^3$, $R^4$, $R^5$ and $R^6$ or $R^9$, $R^{10}$, $R^{11}$ and $R^{12}$ may bind to each other to form a ring.

The ring formed may be saturated or unsaturated, and the ring may be either a hydrocarbon ring or a heterocyclic ring. For example, $R^3$ and $R^4$, $R^4$ and $R^5$, $R^5$ and $R^6$, $R^9$ and $R^{10}$, $R^{10}$ and $R^{11}$ or $R^{11}$ and $R^{12}$ can bind to each other to form, for example, an aromatic heterocyclic ring such as benzene ring or pyridine ring. Preferably, $R^3$ and $R^4$ or $R^9$ and $R^{10}$ bind to each other to form benzene ring.

Examples of the aryl group represented by $R^3$, $R^4$, $R^5$, $R^6$, $R^9$, $R^{10}$, $R^{11}$ or $R^{12}$ include, for example, a phenyl group or a naphthyl group. Examples of the heteroaryl group include, for example, thienyl group, benzothienyl group, furyl group, benzofuryl group, pyrrolyl group, imidazolyl group and quinolyl group. On the aryl group and the heteroaryl group, about 1 to 4 of arbitrary substituents may exist. Positions of the substituents are not limited, and when two or more substituents exist, they may be the same or different. Examples of the substituents include, for example, hydroxyl group, a halogen atom selected from fluorine atom, chlorine atom, bromine atom and iodine atom; a $C_{1-6}$ alkyl group such as methyl group, ethyl group, n-propyl group, isopropyl group, n-butyl group, sec-butyl group, and tert-butyl group; a halogenated $C_{1-6}$ alkyl group such as trifluoromethyl group; a $C_{1-6}$ alkoxyl group such as methoxy group, ethoxy group, n-propoxy group, isopropoxy group, n-butoxy group, sec-butoxy group, and tert-butoxy group; a $C_{1-6}$ alkylenedioxy group such as methylenedioxy group and ethylenedioxy group; carboxyl group; a $C_{1-6}$ alkoxycarbonyl group; unsubstituted amino group; a $C_{1-6}$ alkyl-substituted amino group such as methylamino group, dimethylamino group, and ethylamino group; sulfo group; cyano group and the like.

$X^1$ and $X^2$ each independently represent a substituted or unsubstituted alkyl group having 1 to 15 carbon atoms or a substituted or unsubstituted aryl group, provided when $X^1$ and $X^2$ have carboxyl groups, total number of the carboxyl groups existing in $X^1$ and $X^2$ is 4 or less.

Examples of the unsubstituted alkyl group represented by $X^1$ or $X^2$ include, for example, methyl group, ethyl group, propyl group, butyl group, isobutyl group, sec-butyl group, tert-butyl group, pentyl group, isopentyl group, neopentyl group, tert-pentyl group, 2-methylpropyl group, 1,1-dimethylpropyl group and the like. The alkyl group may be straight, branched, cyclic, or a combination thereof, and a straight or branched alkyl group is preferred.

Examples of the substituted alkyl group represented by $X^1$ or $X^2$ include, for example, a sulfoalkyl group (e.g., 2-sulfoethyl group, 3-sulfopropyl group, 3-methyl-3-sulfopropyl group, 4-sulfobutyl group and the like), a carboxyalkyl group (e.g., 1-carboxymethyl group, 2-carboxyethyl group, 3-carboxypropyl group, 4-carboxybutyl group and the like), a hydroxyalkyl group, an alkoxyalkyl group, an aminoalkyl group, a halogenoalkyl group, a cyanoalkyl group, a heteroaryl-substituted alkyl group, an aryl group, a heteroaryl group and the like, and alkyl moieties in these groups may be the same as the unsubstituted alkyl groups exemplified above. Examples of the substituted or unsubstituted aryl group represented by $R^1$ or $R^2$ include, for example, phenyl group, a sulfophenyl group, a hydroxyphenyl group, and an aminophenyl group.

When the total number of the carboxyl groups which $X^1$ and $X^2$ have is 0 or 1, a carboxyalkyl group having 1 to 5 carbon atoms or a sulfoalkyl group having 1 to 5 carbon atoms are used independently as $X^1$ and $X^2$.

Examples of the divalent bridging group represented by $Y^1$ or $Y^2$ include, for example, a substituted or unsubstituted alkylene group having 1 to 15 carbon atoms such as methylene group, ethylene group, n-butylene group, and methylpropylene group and a substituted or unsubstituted phenylene group as well as a bridging group represented by the following formula:

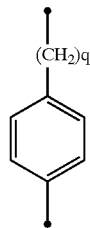

(in the formula, q represents an integer of 1 to 4, and * represents a bonding position). The divalent bridging group represented by $Y^1$ or $Y^2$ may be referred to as "hydrocarbon group".

These hydrocarbon groups may be substituted, and may contain one or more hetero atoms. Said groups may also contain, for example, ether bond, thioether bond, disulfide bond, amide bond, ester bond, sulfoamide bond or sulfoester bond.

Examples of the divalent bridging group represented by $Y^1$ or $Y^2$ include, for example, bridging groups represented by the following formulas:

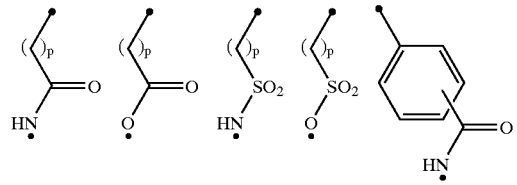

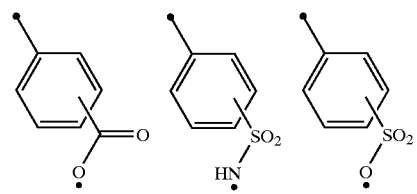

(in the formulas, p represents an integer of 1 to 4, and * represents a bonding position). Preferred examples of $Y^1$ include bridging groups represented by following formulas:

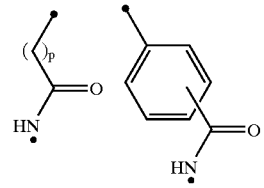

(in the formula, p represents an integer of 1 to 4). $Y^1$ is most preferably —$(CH_2)_p$—CO—NH— (p represents an integer of 1 to 4). Further, preferred examples of $Y^2$ include methylene group and ethylene group.

$L^1, L^2, L^3, L^4, L^5, L^6$ and $L^7$ each independently represent a substituted or unsubstituted methine group. Symbols $m^1$, $m^2$ and $m^3$ each independently represent 0 or 1. It is preferred that all of $m^1$, $m^2$ and $m^3$ represent 1. Examples of the substituent of the methine group include a substituted or unsubstituted alkyl group, a halogen atom, a substituted or unsubstituted aryl group, a lower alkoxyl group and the like. Specific examples of the substituted aryl group include 4-chlorophenyl group and the like. The lower alkoxyl group is preferably an alkoxyl group having 1 to 6 carbon atoms, and may be either a straight or branched alkoxyl group. Specific examples include methoxy group, ethoxy group, propoxy group, butoxy group, tertbutoxy group, pentyloxy group and the like, and preferred are methoxy group and ethoxy group. As the substituent of the methine group, methyl group and phenyl group can be preferably used.

When the methine group represented by $L^1$, $L^2$, $L^3$, $L^4$, $L^5$, $L^6$ or $L^7$ is substituted, the substituents on the methine groups may bind to each other to form a ring. Preferably, the substituents on the methine groups may bind to form a ring containing three continuous methine groups selected from $L^1$, $L^2$, $L^3$, $L^4$, $L^5$, $L^6$ and $L^7$. Examples of the compound where substituents on the methine groups bind to each other to form a ring containing three continuous methine groups selected from $L^1$, $L^2$, $L^3$, $L^4$, $L^5$, $L^6$ and $L^7$ include, for example, the compound where 4,4-dimethylcyclohexene ring containing $L^3$, $L^4$ and $L^5$ is formed. Particularly preferred partial structures containing a ring on a conjugated methine chain constituted by methine groups selected from $L^1$, $L^2$, $L^3$, $L^4$, $L^5$, $L^6$ and $L^7$ are groups represented by the following formula (a).

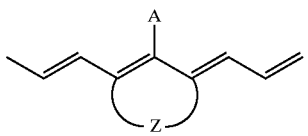

In the formula, Z represents a group of nonmetallic atoms required to form a 5- or 6-membered ring, and A represents hydrogen atom or a monovalent group.

Examples of the nonmetallic atoms required to form a 5- or 6-membered ring represented by Z include, for example, carbon atom, nitrogen atom, oxygen atom, hydrogen atom, sulfur atom, a halogen atom (fluorine atom, chlorine atom, bromine atom, iodine atom) and the like. Examples of the 5- or 6-membered ring contained in the partial structure represented by the formula (a) include, for example, cyclopentene ring, cyclohexene ring, 4,4-dimethylcyclohexene ring and the like, and preferred are cyclohexene ring and cyclopentene ring.

Examples of the monovalent group represented by A include a substituted or unsubstituted alkyl group, a substituted or unsubstituted aryl group, a substituted or unsubstituted aralkyl group, a substituted or unsubstituted lower alkoxyl group, a substituted or unsubstituted amino group, a substituted or unsubstituted alkylcarbonyloxy group (acetoxy group and the like), a substituted or unsubstituted alkylthio group, a substituted or unsubstituted arylthio group, cyano group, nitro group, a halogen atom and the like.

Specifically, examples of the aralkyl group represented by A include benzyl group, 2-phenylethyl group, 3-phenylpropyl group and the like, and examples of the substituent of the aralkyl group include, for example, sulfo group, carboxyl group, hydroxyl group, a substituted or unsubstituted alkyl group, an alkoxyl group, a halogen atom and the like. Specific examples of the substituted amino group represented by A include, for example, an alkylamino group (methylamino group, ethylamino group and the like), a dialkylamino group (dimethylamino group, diethylamino group and the like), phenylamino group, diphenylamino group, methylphenylamino group, and a cyclic amino group (morpholino group, imidazolidino group, ethoxycarbonylpiperazino group and the like), and when they are substituted, examples of the substituent include sulfo group, carboxyl group and the like. Specifically, examples of the alkylthio group represented by A include phenylthio group, naphthylthio group and the like, and examples of the substituent of the alkylthio group include sulfo group, carboxyl group and the like.

Preferred examples of the monovalent group represented by A include phenylamino group, diphenylamino group, ethoxycarbonylpiperazino group, an arylthio group and the like.

Y represents a nonmetallic element required to form a 5- to 10-membered heterocyclic ring, preferably a 5- or 6-membered heterocyclic ring (this heterocyclic ring may have a condensed ring). Examples of the 5- to 10-membered heterocyclic ring formed with Y include a thiazole nucleus (e.g., thiazole, 4-methylthiazole and the like), a benzothiazole nucleus (e.g., benzothiazole, 4-chlorobenzothiazole and the like), a naphthothiazole nucleus (e.g., naphtho [2,1-d] thiazole, naphtho [1,2-d]thiazole and the like), a thiazoline nucleus (e.g., thiazoline, 4-methylthiazoline and the like), an oxazole nucleus (e.g., oxazole, 4-nitrooxazole and the like), a benzoxazole nucleus (e.g., benzoxazole, 4-chlorobenzoxazole and the like), a naphthooxazole nucleus (e.g., naphtho[2,1-d]oxazole, naphtho[1,2-d] oxazole and the like), a selenazole nucleus (e.g., selenazole, 4-phenylselenazole and the like), a benzoselenazole nucleus (e.g., benzoselenazole, 4-chlorobenzoselenazole and the like), a naphthoselenazole nucleus (e.g., naphtho[2,1-d] selenazole, naphtho[1,2-d]selenazole and the like), a 3,3-dialkylindolenine nucleus (e.g., 3,3-dimethylindolenine, 3,3-diethylindolenine, 3,3-dimethyl-5-nitroindolenine and the like), an imidazole nucleus (e.g., 1-alkylimidazole, 1-alkyl-4-phenylimidazole and the like), a pyridine nucleus (e.g., 2-pyridine, 5-methyl-2-pyridine and the like), a quinoline nucleus (e.g., 2-quinoline, 3-methyl-2-quinoline and the like), an imidazo[4,5-b]quinoxaline nucleus (e.g., 1,3-diethylimidazo[4,5-b]quinoxaline and the like) and the like. Preferred examples of the 5- to 10-membered heterocyclic ring formed with Y include a 3,3-dialkylindolenine nucleus.

M represents hydrogen atom, a metal or a quaternary ammonium salt. Examples of the metal include alkali metals such as sodium and potassium, alkaline earth metals such as magnesium and calcium and the like, and examples of the ammonium salt include ammonium salts, triethylammonium salts and tributylammonium salts, amino acid salts such as lysine salts and arginine salts. However, M is not limited to these examples.

The compounds of the present invention may have one or more asymmetric carbons depending on types of substituents. A sulfur atom may serve as an asymmetric center. Any enantiomers in pure forms based on one or more asymmetric carbons, any mixture of such enantiomers, racemates, diastereoisomers based on two or more asymmetric carbons, any mixtures of such diastereoisomers and the like all fall within the scope of the present invention. Furthermore, the compounds of the present invention may exist as hydrates or solvates, and these substances also fall within the scope of the present invention.

Specific examples of the compounds of the present invention will be mentioned below. However, the present invention is not limited to the compounds mentioned below.

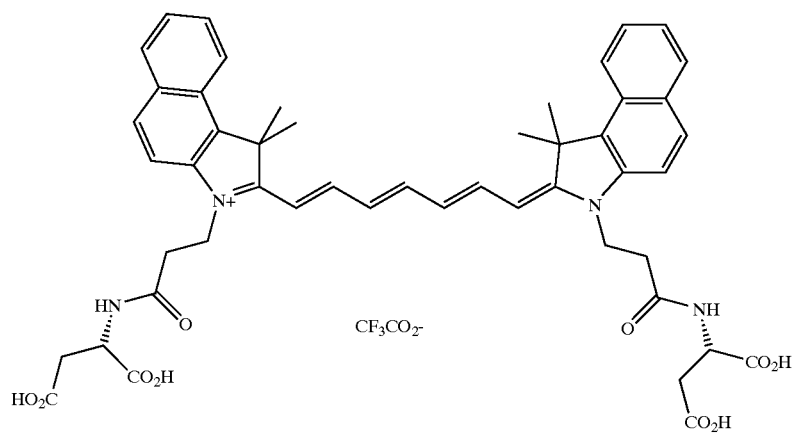
Compound 1
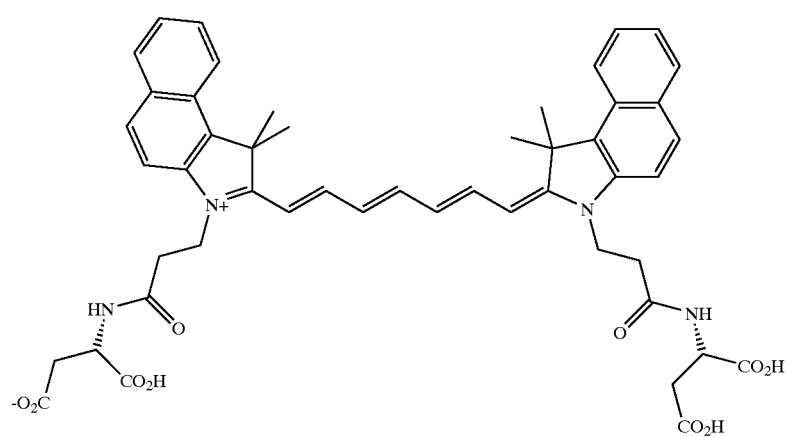
Compound 2
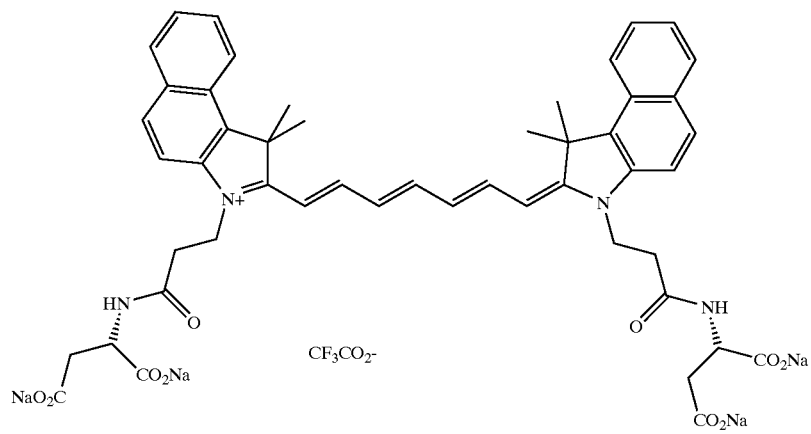
Compound 3
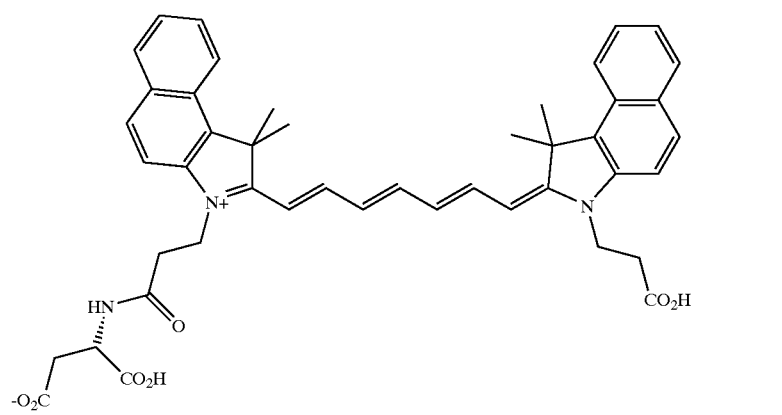
Compound 4

Compound 5
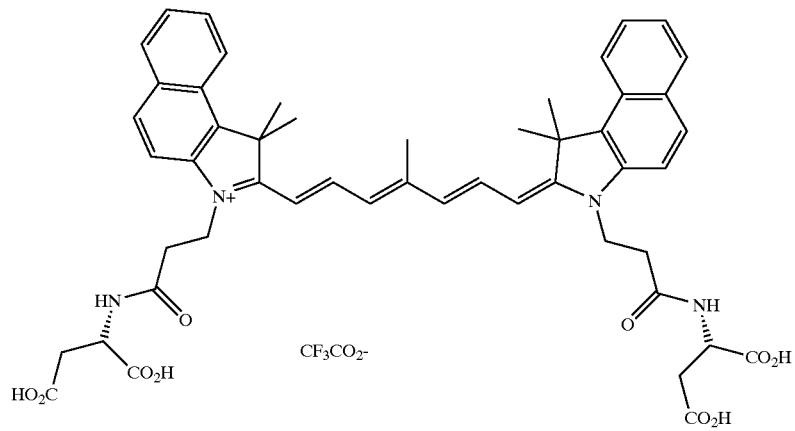
Compound 6
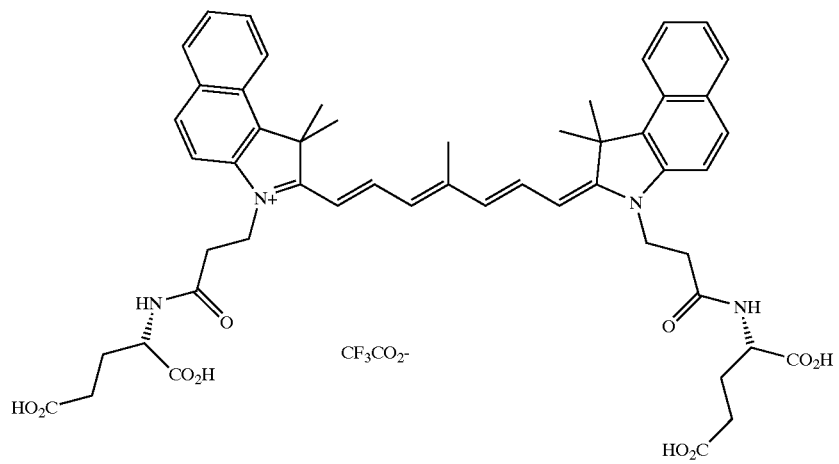
Compound 7
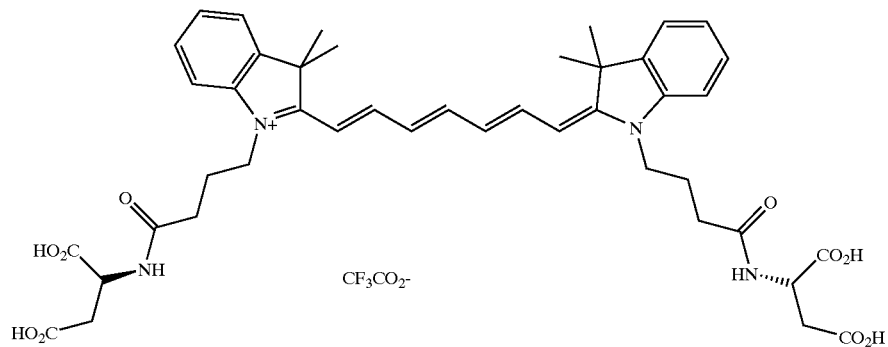
Compound 8
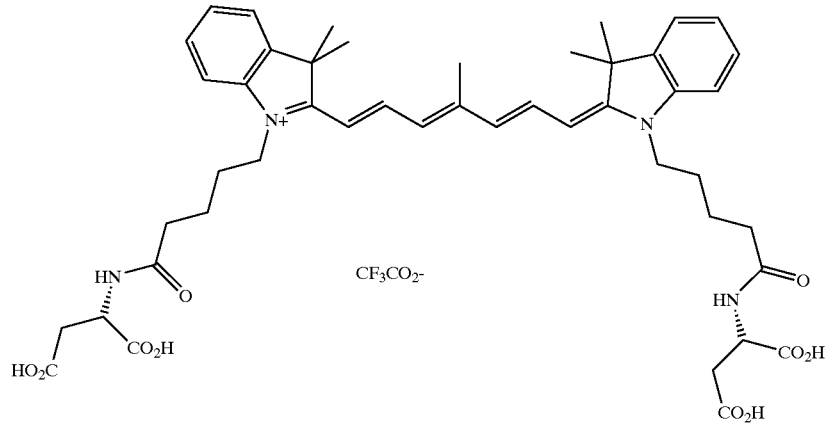

Compound 9
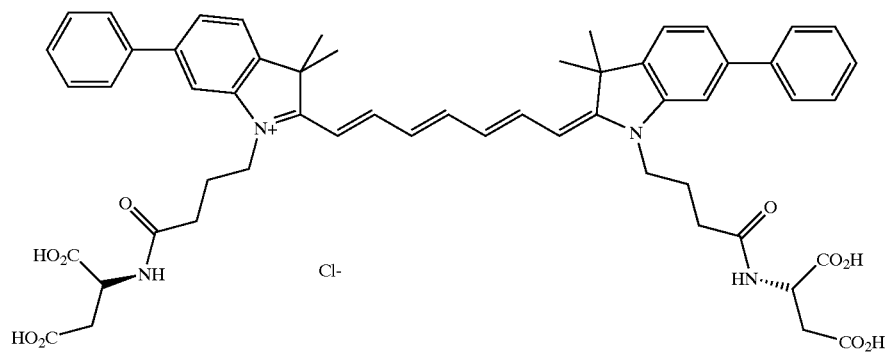
Compound 10
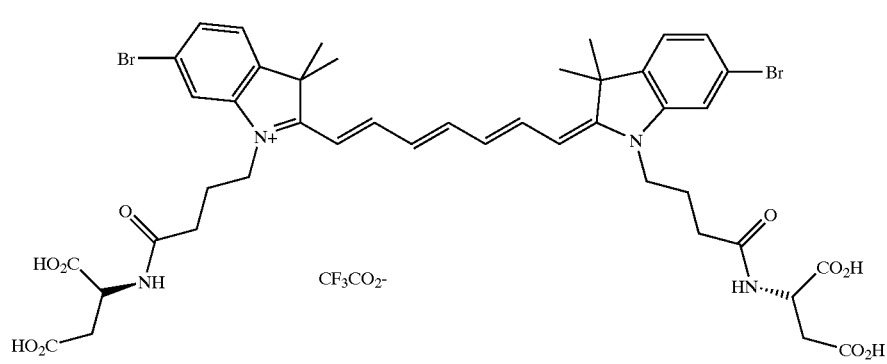
Compound 11
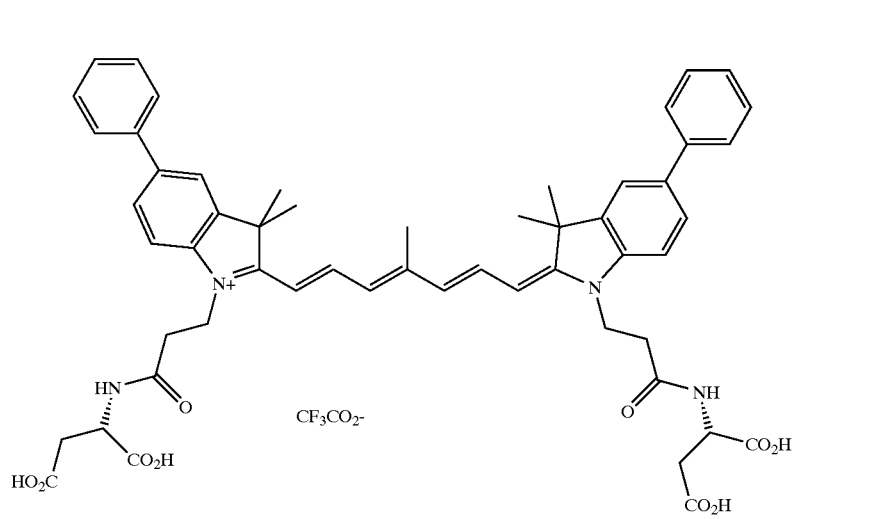
Compound 12
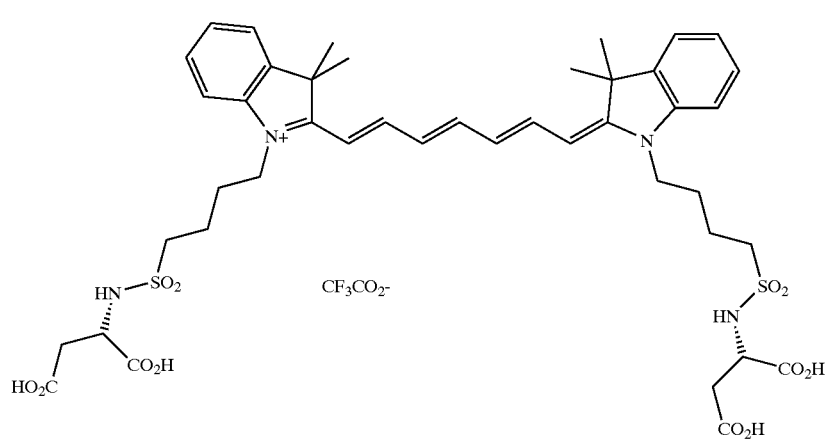

Compound 13
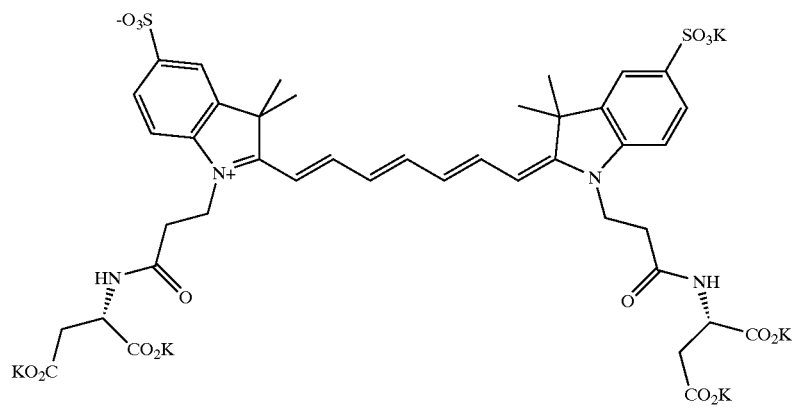
Compound 14
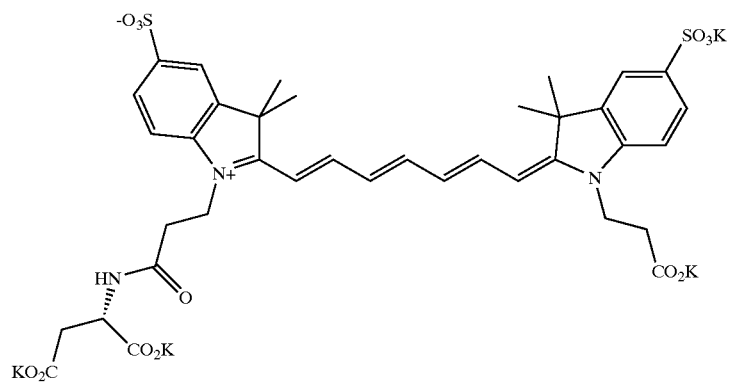
Compound 15
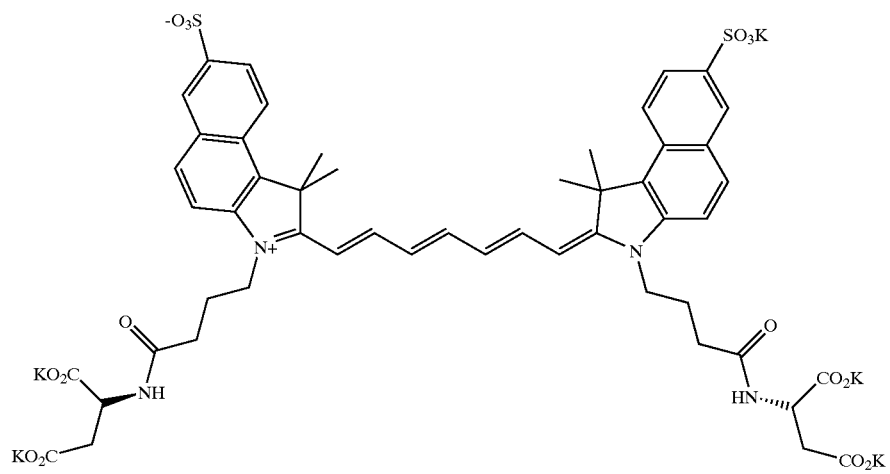

-continued
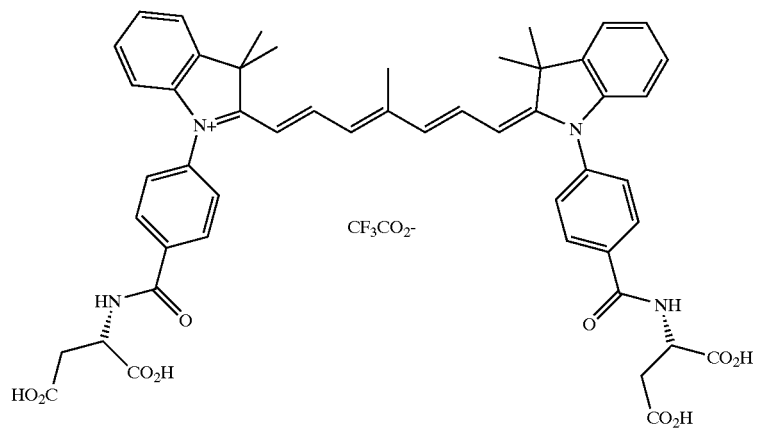
Compound 16
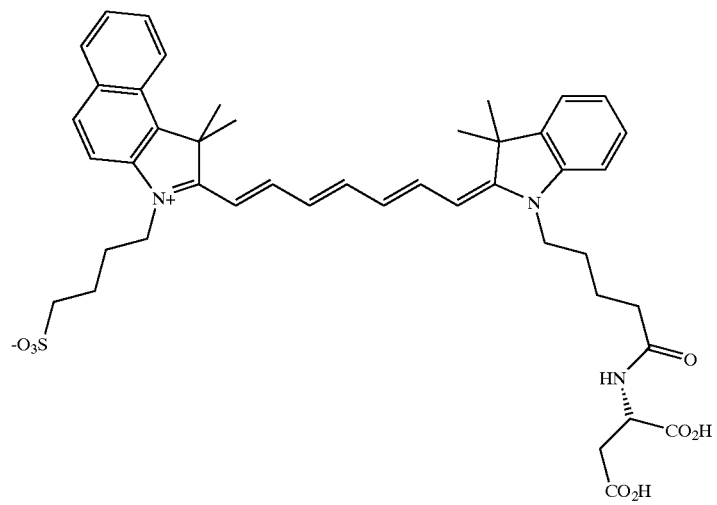
Compound 17
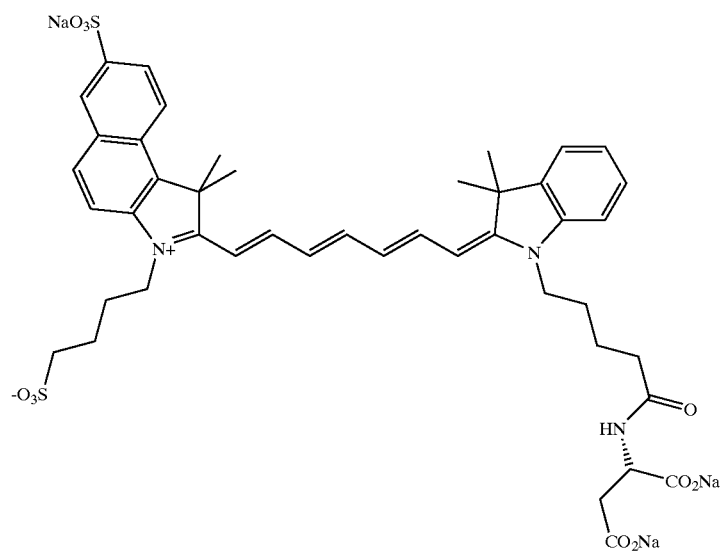
Compound 18

-continued
Compound 19
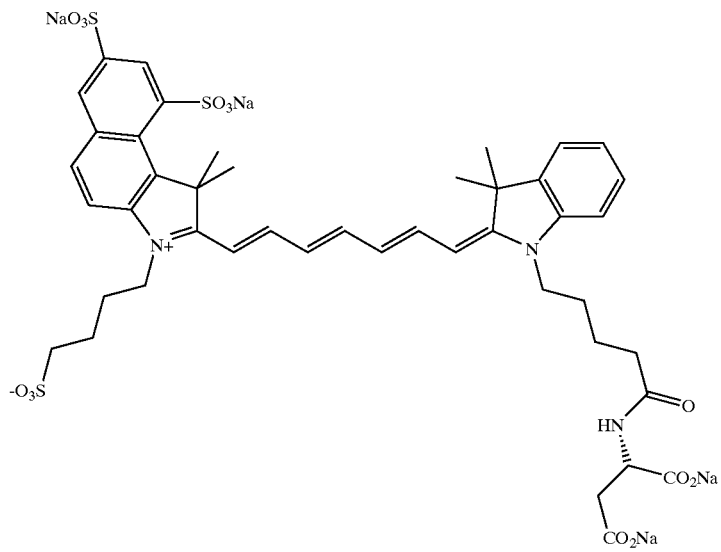
Compound 20
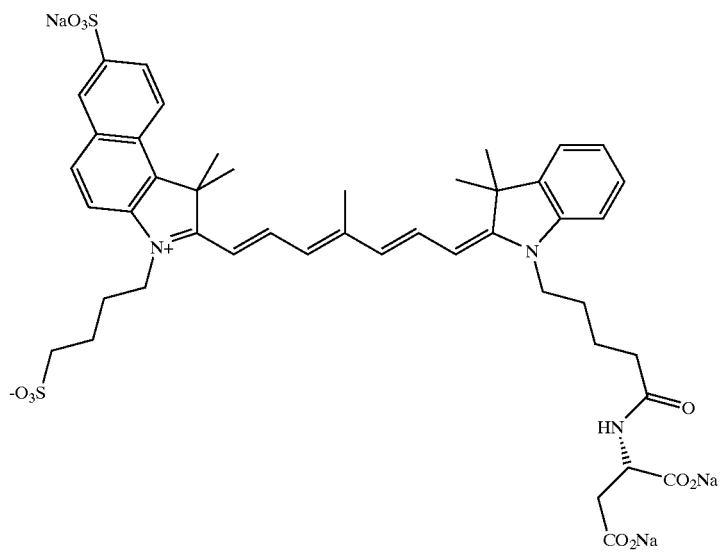
Compound 21
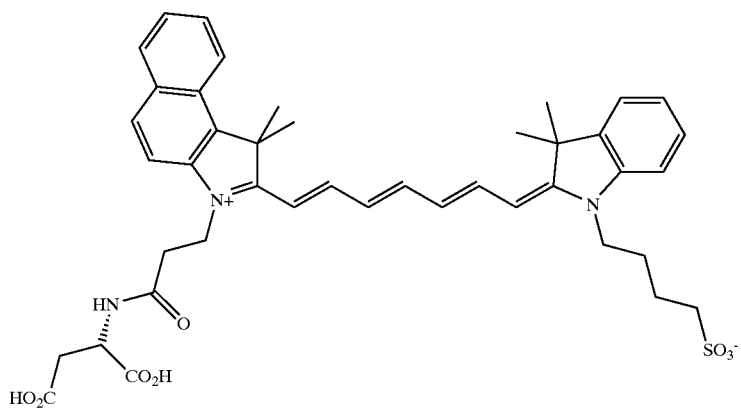

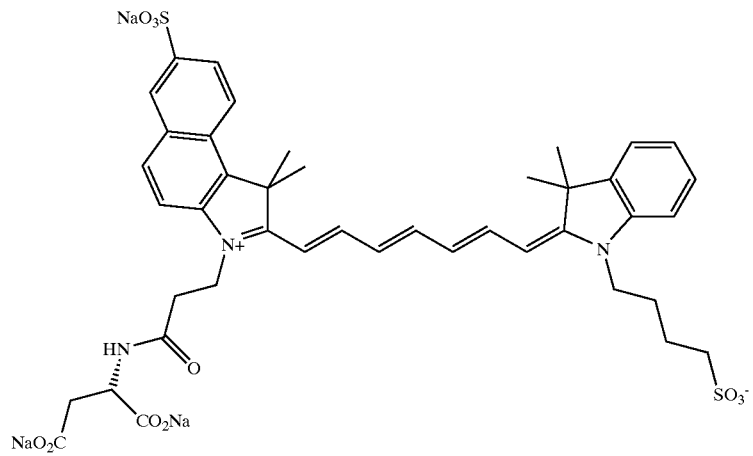
Compound 22
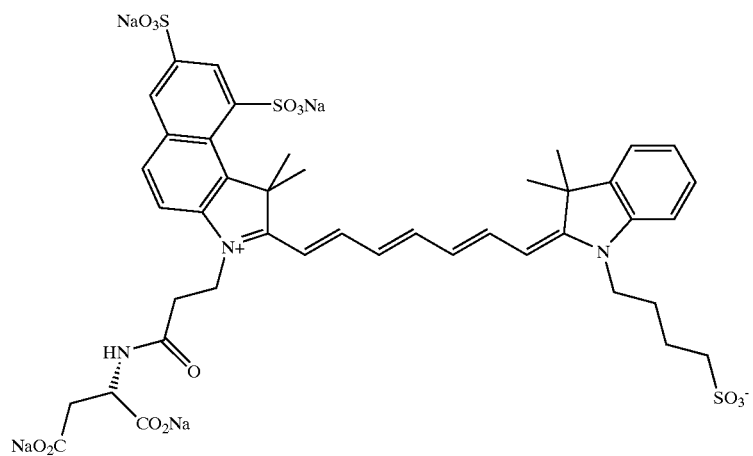
Compound 23
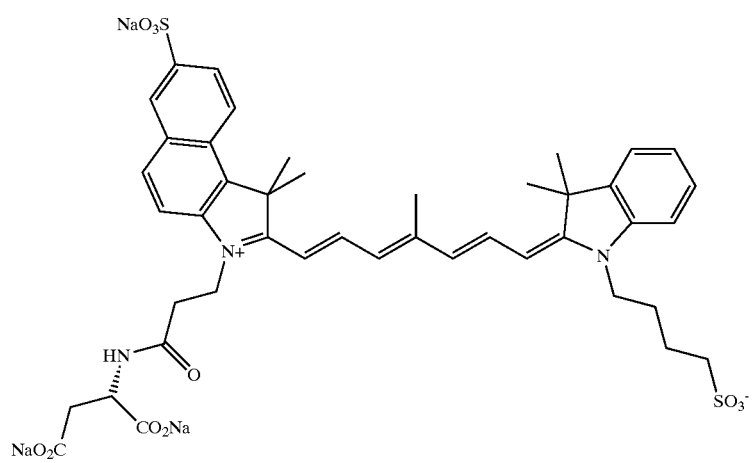
Compound 24

-continued
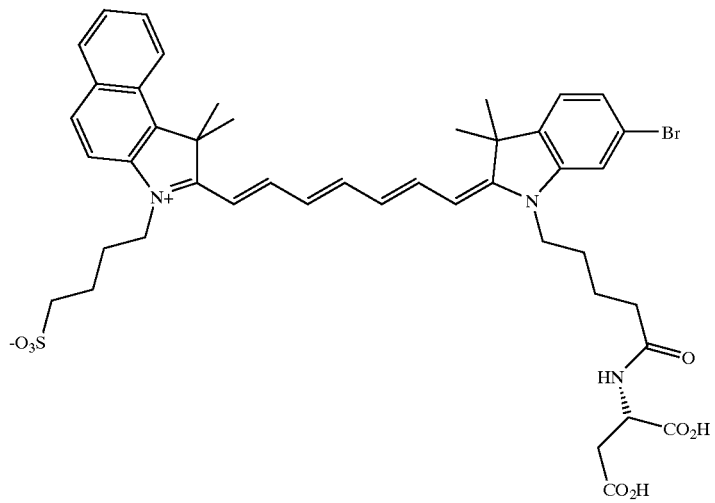
Compound 25
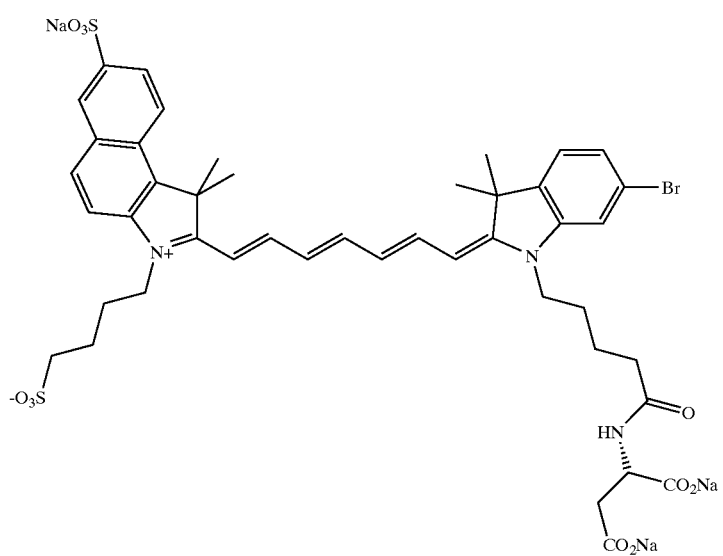
Compound 26
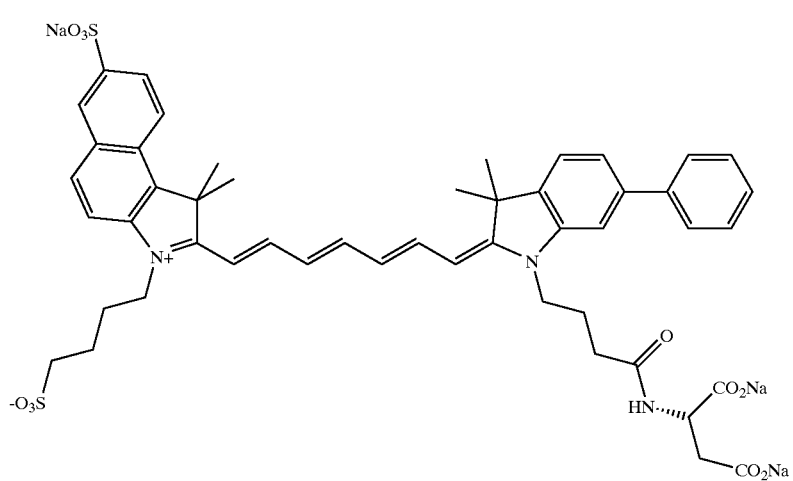
Compound 27

Compound 28
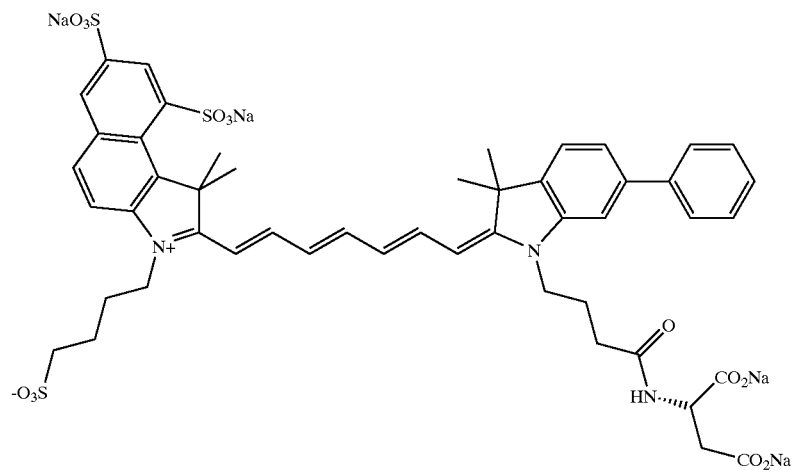
Compound 29
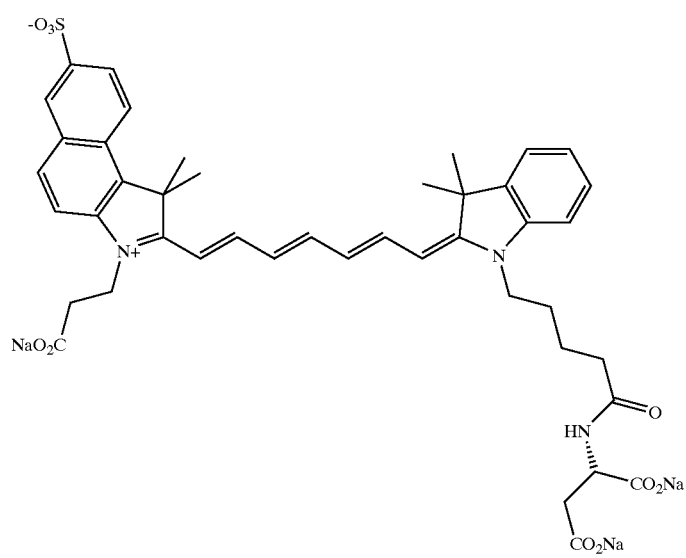
Compound 30
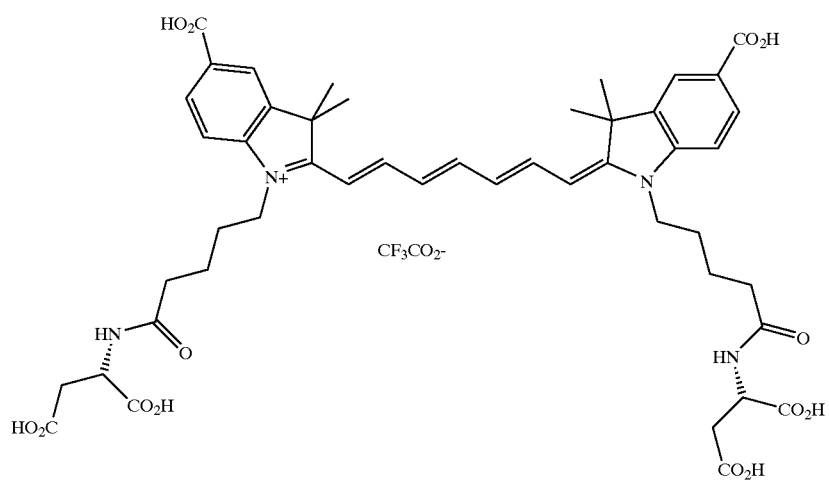

-continued
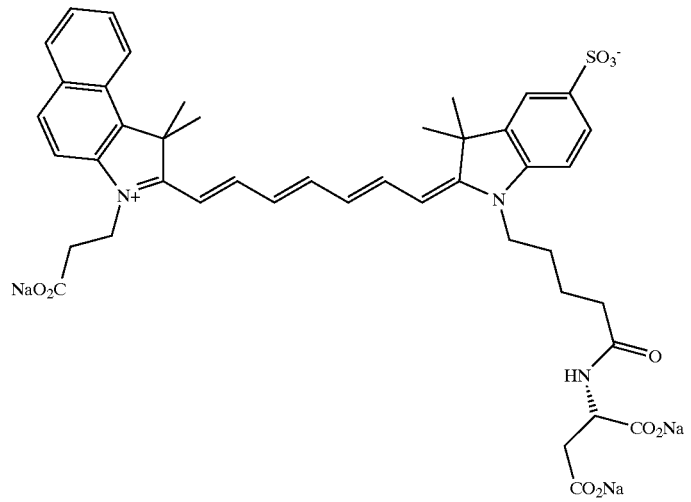
Compound 31
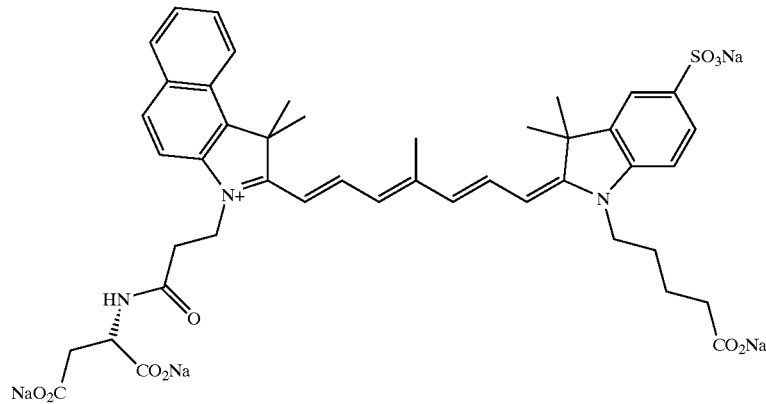
Compound 32
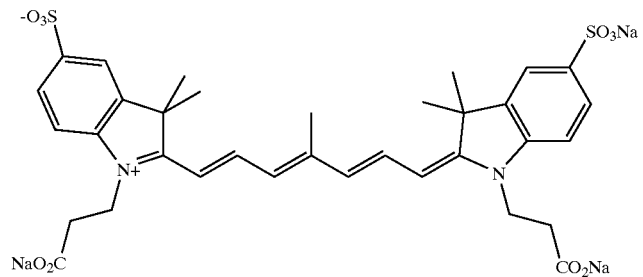
Compound 33
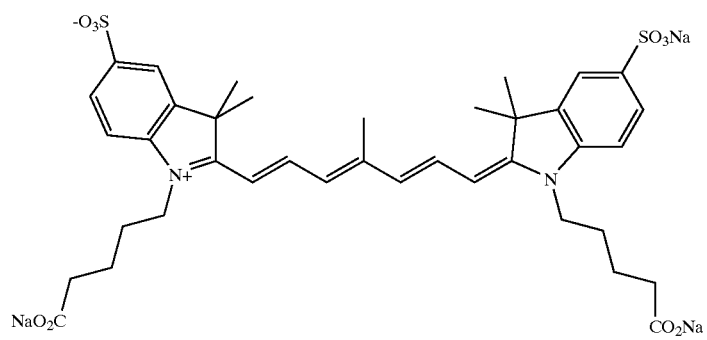
Compound 34

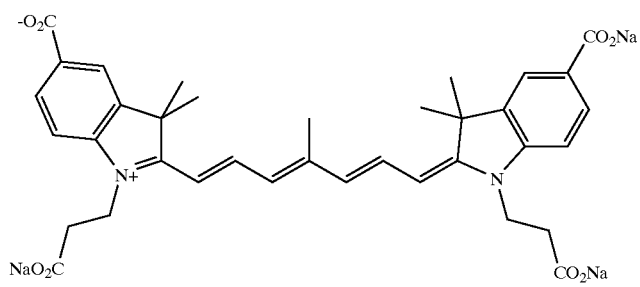
Compound 35
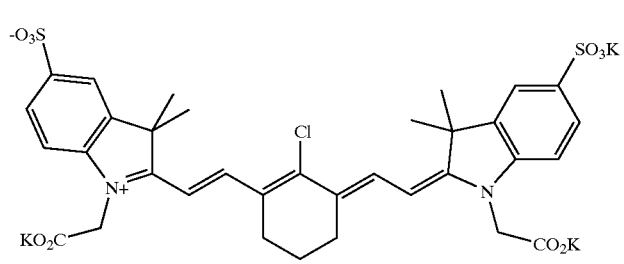
Compound 36
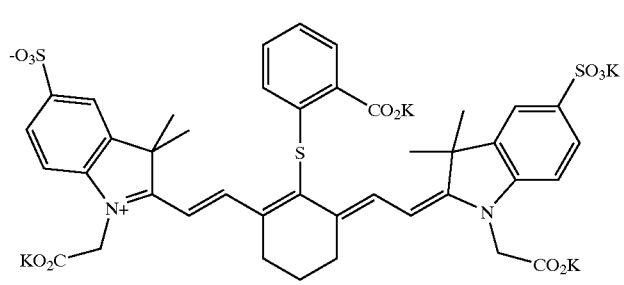
Compound 37
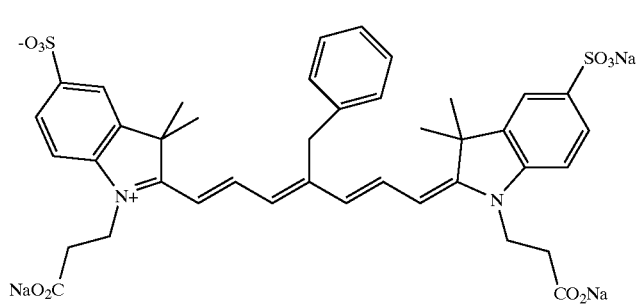
Compound 38
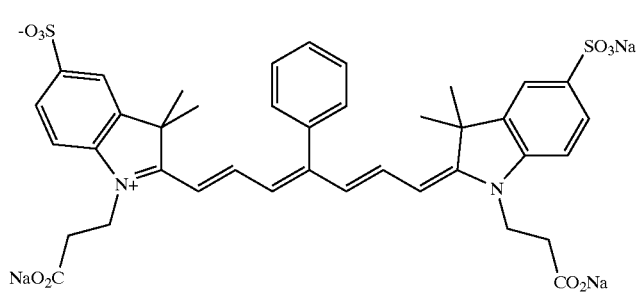
Compound 39

-continued
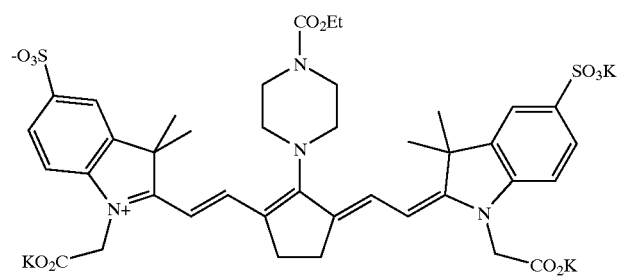
Compound 40
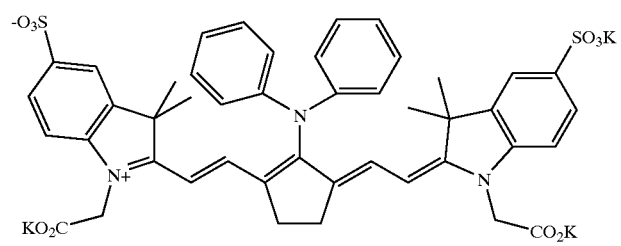
Compound 41
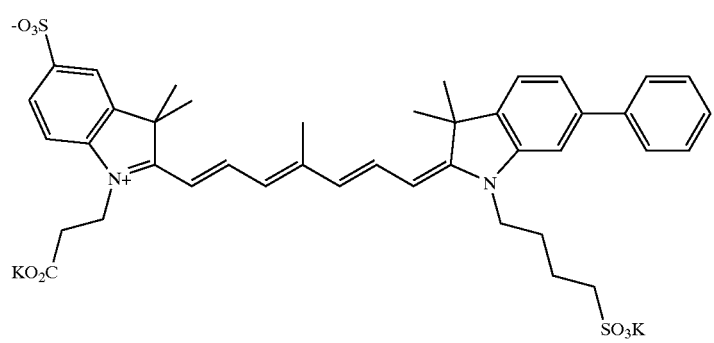
Compound 42
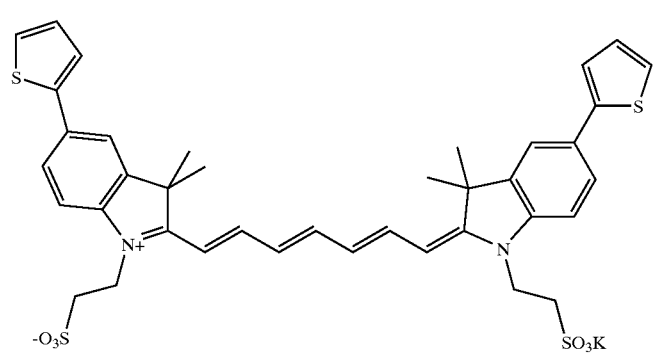
Compound 43
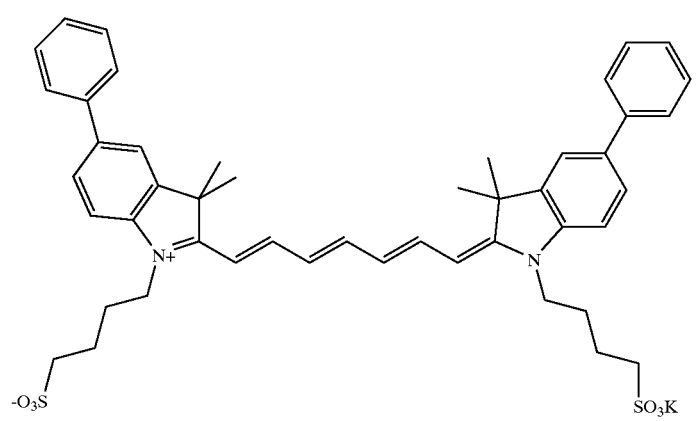
Compound 44

-continued
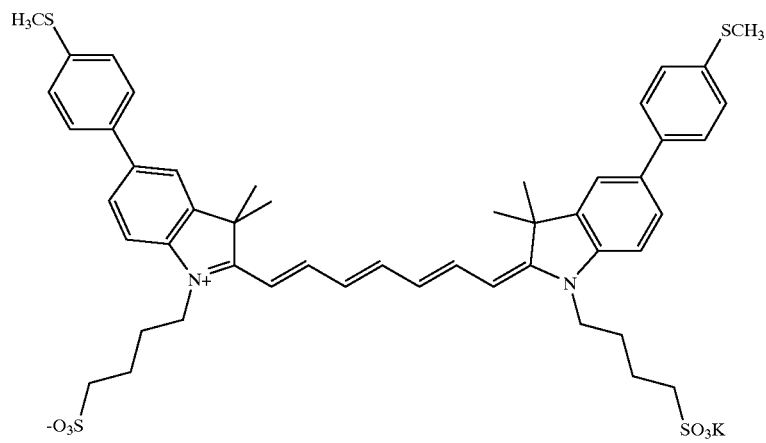
Compound 45
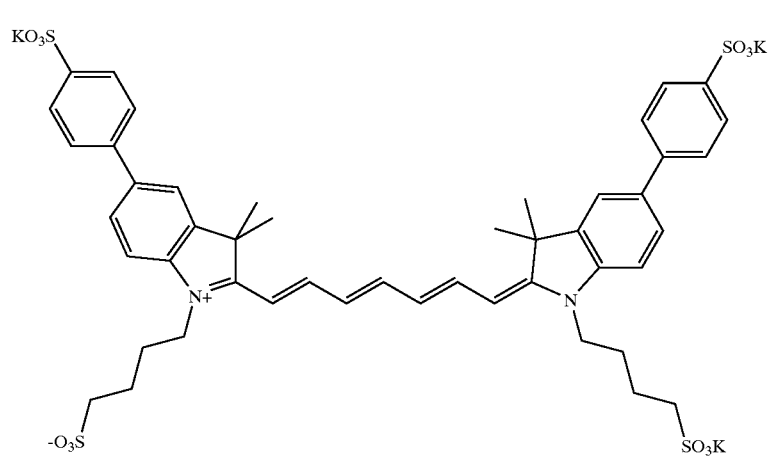
Compound 46
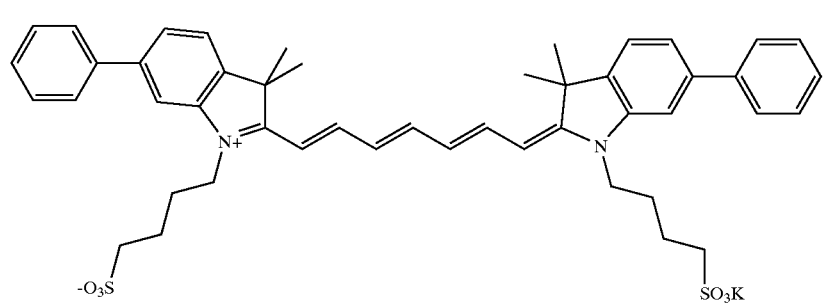
Compound 47
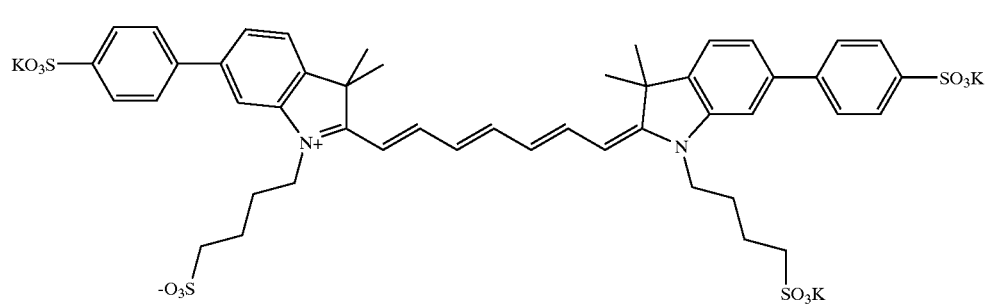
Compound 48

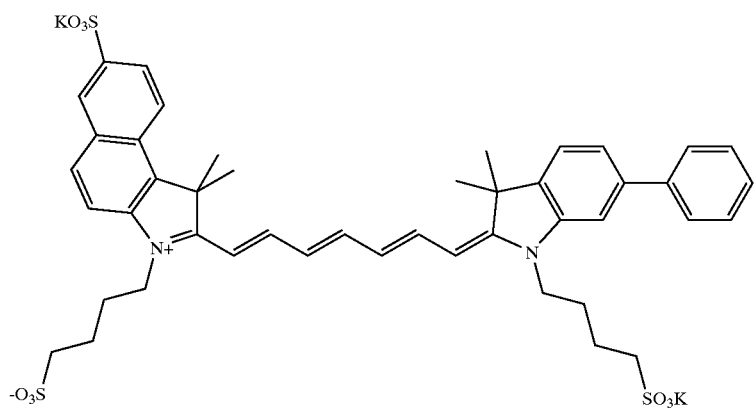
Compound 49
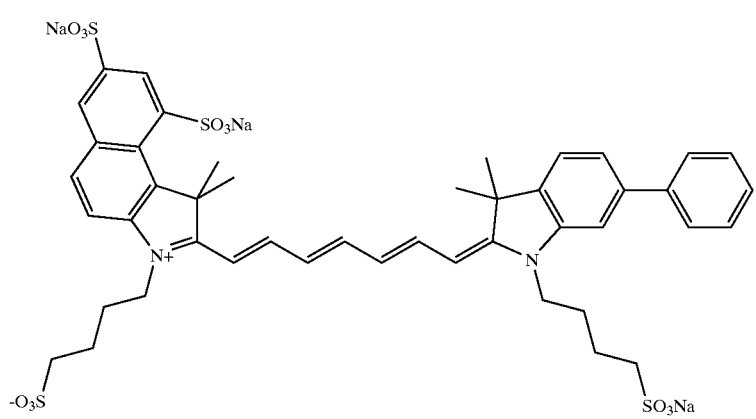
Compound 50
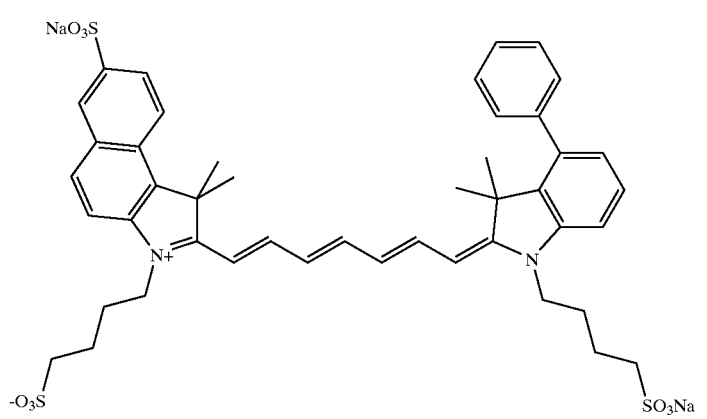
Compound 51
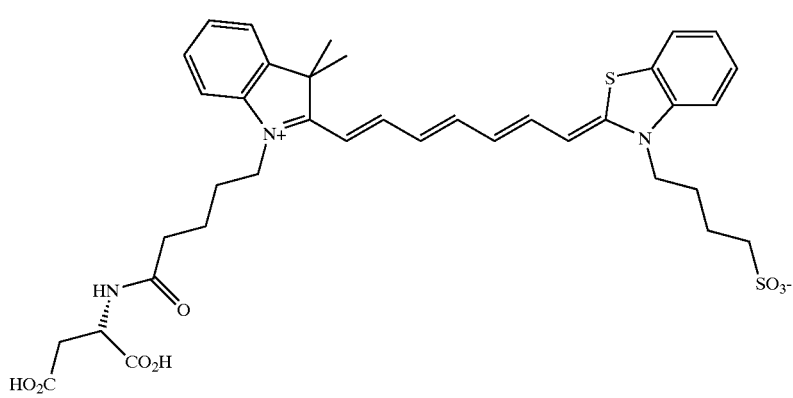
Compound 52

The cyanine dyes represented by the aforementioned formula (I) or (II) can be synthesized according to known preparation methods of cyanine dyes described in F. M. Hamer, The Cyanine Dyes and Related Compounds, John Wiley and Sons, New York, 1964; Cytometry, 11, pp.416–430, 1990; Cytometry, 12, pp.723–730, 1990; Bioconjugate Chem., 4, pp.105–111, 1993; Anal. Biochem., 217, pp.187–204, 1994; Tetrahedron, 45, pp.4845–4866, 1989; European Patent Application Nos. 0591820A1, 0580145A1 and the like, and they can also be semi-synthesized from commercially available cyanine dyes by suitable known methods. More specifically, they can be synthesized by a reaction of a dianyl compound with a heterocyclic ring quaternary salt.

The method for producing the cyanine dyes represented by the aforementioned formula (I) or (II) is not particularly limited, and they can be synthesized according to various kinds of synthetic routes. Specific methods for preparation are described in the examples of the specification for typical compounds of the present invention, and accordingly, those skilled in the art can prepare cyanine dyes falling within the scope of the aforementioned formulas by referring to the methods described in the examples, and if necessary, by appropriately modifying or altering the methods and appropriately choosing starting materials and reagents. For the syntheses, one or more steps of various condensation reactions, addition reactions, oxidation reactions, reduction reactions and the like can be used in combination. These reactions are described in detail in published books. For example, various kinds of methods described as unit operations and raw material mentioned in "Jikken Kagaku Koza (Lecture of Experimental Chemistry)" (published by Maruzen, each separate volume contained in each edition from the first edition to the 4th edition can be used) may preferably be used.

For example, in the methods for preparation, when a defined group changes under a condition of a certain reaction step or is unsuitable for performing a certain reaction step, the desired step may be efficiently performed by using methods commonly used in the field of organic synthetic chemistry, for example, means of protection and deprotection of functional groups or treatments such as oxidation, reduction, and hydrolysis. In the aforementioned steps, synthetic intermediates and target compounds can be isolated and purified by using purification methods commonly used in organic synthetic chemistry, for example, filtration, extraction, washing, drying, concentration, recrystallization, various chromatography techniques and the like. Synthetic intermediates can be used in a subsequent reaction without particular isolation.

Method of addition of the compounds represented by the aforementioned formula (I) or (II) or salts thereof of the present invention into a silver halide photographic light-sensitive material is not particularly limited, and they can be suitably formulated by ordinary means in the field of silver halide photographic light-sensitive material. Performances of silver halide photographic light-sensitive materials containing the compounds or salts thereof of the present invention can also be determined by ordinary methods. Specific means are described in the test examples of the following examples, and accordingly, those skilled in the art can appropriately use the compounds and salts thereof of the present invention for manufacture of silver halide light-sensitive materials to produce silver halide photographic light-sensitive materials having desired performances.

EXAMPLES

The present invention will be explained more specifically with reference to examples. However, the scope of the present invention is not limited to these Examples. The compound numbers in the examples correspond to those of the preferred compounds exemplified above.

Example 1

Syntheses of Compounds 1 to 3

The synthetic route of Compound 1 is shown below.

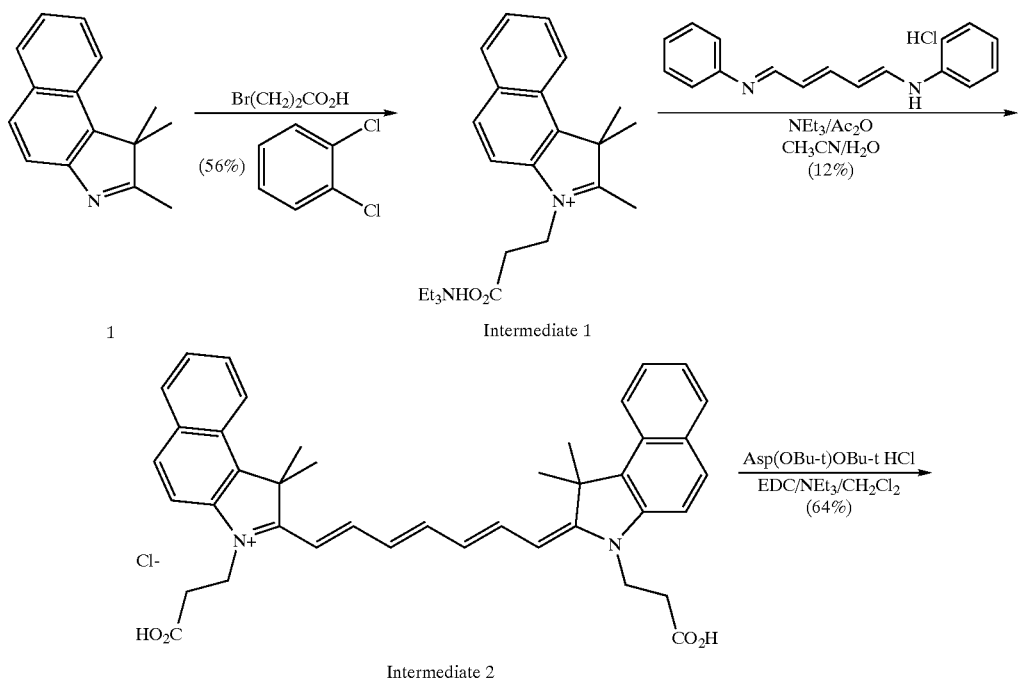

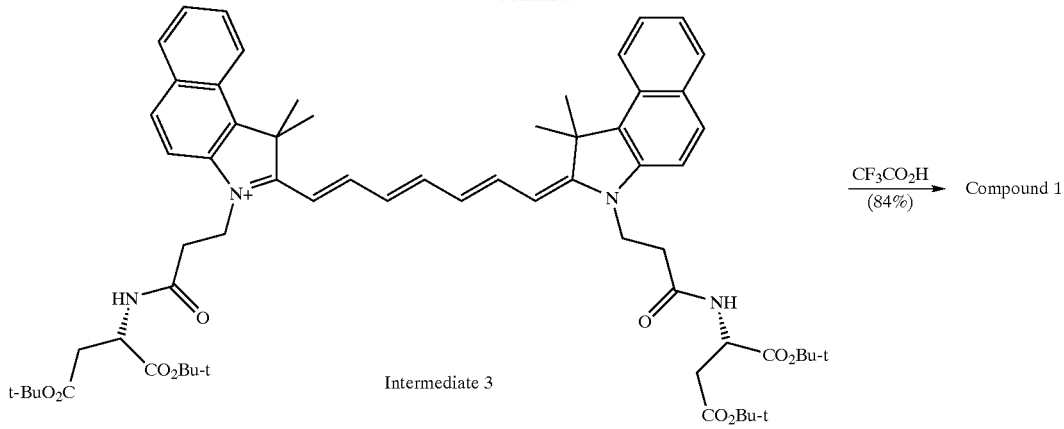

Intermediate 3

$\xrightarrow[(84\%)]{CF_3CO_2H}$ Compound 1

Synthesis of Intermediate 1

Starting material 1 (20.9 g, 0.1 mol), 2-bromopropionic acid (23.0 g, 0.15 mol) and o-dichlorobenzene (20 mL) were heated at 140° C. for 2 hours with stirring. After the reaction, the reaction mixture was added with acetone (200 mL) and cooled to room temperature, and then the produced crystals were collected by filtration to obtain Intermediate 1. Yield: 20.3 g (56%).

Synthesis of Intermediate 2

Intermediate 1 obtained above (10.0 g, 28 mmol) and 1,7-diaza-1,7-diphenyl-1,3,5-heptatriene monohydrochloride (3.9 g, 14 mmol) were dissolved in acetonitrile (70 mL) and water (11 mL), added with triethylamine (8.4 g, 91 mmol) and acetic anhydride (8.5 g, 91 mmol) and stirred overnight at room temperature. The reaction mixture was added dropwise to 0.1 N aqueous hydrochloric acid (900 mL), and the produced crystals were collected by filtration and purified by column chromatography (development solvent:methylene chloride:methanol=95:5 to 90:10) to obtain Intermediate 2. Yield: 2.1 g (12%).

Synthesis of Intermediate 3

Intermediate 2 (1.0 g, 1.5 mmol) obtained above, L-aspartic acid di-t-butyl ester monohydrochloride (1.3 g, 4.5 mmol) and dimethylaminopyridine (40 mg, 0.3 mmol) were dissolved in methylene chloride (50 mL) and cooled on ice. The reaction mixture was added with 1-ethyl-3-(3-dimethylaminopropyl)carbodiimide hydrochloride (EDC, 700 mg, 4 mmol) and triethylamine (340 mg, 3 mmol) and stirred overnight at 4° C. The reaction mixture was added with methylene chloride (200 mL) and 0.1 N aqueous hydrochloric acid (200 mL), and then the methylene chloride layer was separated, washed with saturated brine (200 mL) and dried over sodium sulfate. The solvent was evaporated under reduced pressure, and the residue was purified by column chromatography (development solvent:ethyl acetate:methanol=95:5 to 80:20) to obtain Intermediate 3. Yield: 1.1 g (64%).

Synthesis of Compounds 1, 2 and 3

The resulting Intermediate 3 (500 mg, 0.5 mmol) was dissolved in trifluoroacetic acid (5 mL) and allowed to react overnight at 4° C., and the trifluoroacetic acid was evaporated under reduced pressure. The residue was added with water (50 mL), and the produced crystals were collected by filtration and washed with water and ethyl acetate to obtain Compound 1 (390 mg, yield: 90%).

Compound 1 was purified by column chromatography (development solvent:methanol) using Sephadex (LH-20, Pharmacia) to obtain Compound 2.

Further, Compound 1 was passed through an ion exchange resin CR[11] (Mitsubishi Chemical, development solvent:methanol) to obtain Compound 3.

Compound 1

$^1$H-NMR (CD$_3$OD) δ 1.98 (s, 12H), 2.70 (d, J=7.2 Hz, 4H), 2.80 (t, J=7.2 Hz, 4H), 3.30 (MeOH), 4.50 (t, J=7.2 Hz, 4H), 4.60 (t, J=7.2 Hz, 2H), 4.80 (H$_2$O), 6.40 (d, J=13.2 Hz, 2H), 6.63 (dd, J=13.2, 13.2 Hz, 2H), 7.40–7.50 (m, 2H), 7.58–7.66 (m, 5H), 7.95–8.07 (m, 6H), 8.20 (d, J=7.2 Hz, 2H).

Compound 2

$^1$H-NMR (CD$_3$OD) δ 1.99 (s, 12H), 2.72 (d, J=7.2 Hz, 4H), 2.80 (t, J=7.2 Hz, 4H), 3.30 (MeOH), 4.50 (t, J=7.2 Hz, 4H), 4.60 (t, J=7.2 Hz, 2H), 4.80 (H$_2$O), 6.38 (d, J=13.2 Hz, 2H), 6.61 (dd, J=13.2, 13.2 Hz, 2H), 7.40–7.50 (m, 2H), 7.58–7.67 (m, 5H), 7.96–8.07 (m, 6H), 8.21 (d, J=7.2 Hz, 2H).

Compound 3

$^1$H-NMR (CD$_3$OD) δ 1.98 (s, 12H), 2.56–2.65 (m, 4H), 2.75–2.85 (m, 4H), 3.30 (MeOH), 4.45–4.50 (m, 4H), 4.80 (H$_2$O), 6.20 (d, J=13.2 Hz, 2H), 6.65 (dd, J=13.2, 13.2 Hz, 2H), 7.40–7.50 (m, 2H), 7.58–7.70 (m, 5H), 7.95–8.07 (m, 6H), 8.20 (d, J=7.2 Hz, 2H).

Example 2

Synthesis of Compound 5

Compound 5 was synthesized in the same manner as that used for Compound 1 from Intermediate 1 and 1,7-diaza-5-methyl-1,7-diphenyl-1,3,5-heptatriene monohydrochloride.

$^1$H-NMR (CD$_3$OD) δ 2.00 (s, 12H), 2.44 (s, 3H), 2.73 (d, J=7.2 Hz, 4H), 2.82 (t, J=7.2 Hz, 4H), 3.31 (MeOH), 4.50 (t, J=7.2 Hz, 4H), 4.69 (t, J=7.2 Hz, 2H), 4.88 (H$_2$O), 6.41 (d, J=13.2 Hz, 2H), 6.65 (d, J=13.2 Hz, 2H), 7.43–7.50 (m, 2H), 7.58–7.67 (m, 4H), 7.95–8.05 (m, 4H), 8.10–8.27 (m, 4H).

Example 3

Synthesis of Compound 6

Compound 6 was synthesized in the same manner as that used for Compound 1 from Intermediate 1 and 1,7-diaza-5-methyl-1,7-diphenyl-1,3,5-heptatriene monohydrochloride by using L-glutamic acid di-t-butyl ester monohydrochloride instead of the L-aspartic acid di-t-butyl ester monohydrochloride in the course of the synthetic process.

$^1$H-NMR (CD$_3$OD) δ 1.80–2.15 (m, 4H), 2.01 (s, 12H), 2.28 (t, J=7.2 Hz, 4H), 2.44 (s, 3H), 2.82 (t, J=7.2 Hz, 4H), 3.31 (MeOH), 4.40–4.50 (m, 2H), 4.51 (t, J=7.2 Hz, 4H), 4.88 (H$_2$O), 6.42 (d, J=13.2 Hz, 2H), 6.65 (d, J=13.2 Hz, 2H), 7.42–7.50 (m, 2H), 7.57–7.67 (m, 4H), 7.95–8.05 (m, 4H), 8.10–8.27 (m, 4H).

Example 4

Synthesis of Compound 7

Compound 7 was synthesized in the same manner as that used for Compound 1 from 2,3,3-trimethylindolenine.

$^1$H-NMR (CD$_3$OD) δ 1.70 (s, 12H), 2.05–2.13 (m, 4H), 2.55 (t, J=7.2 Hz, 4H), 2.78–2.92 (m, 4H), 3.30 (MeOH), 4.10 (t, J=7.2 Hz, 4H), 4.89 (H$_2$O), 6.45 (d, J=13.2 Hz, 2H), 6.50 (J=13.2 Hz, 2H), 7.29–7.50 (m, 8H), 7.92 (dd, J=13.2, 13.2 Hz, 2H).

Example 5

Synthesis of Compound 8

Compound 8 was synthesized in the same manner as that used for Compound 1 from 2,3,3-trimethylindolenine by using 1,7-diaza-5-methyl-1,7-diphenyl-1,3,5-heptatriene monohydrochloride instead of the 1,7-diaza-1,7-diphenyl-1,3,5-heptatriene monohydrochloride.

$^1$H-NMR (CD$_3$OD) δ 1.70 (s, 12H), 1.72–1.90 (m, 8H), 2.35–2.39 (m, 7H), 2.73–2.84 (m, 4H), 3.30 (MeOH), 4.08 (t, J=7.2 Hz, 4H), 4.66 (t, J=7.2 Hz, 2H), 4.89 (H$_2$O), 6.33 (d, J=13.2 Hz, 2H), 6.63 (d, J=13.2 Hz, 2H), 7.18–7.50 (m, 8H), 8.05 (dd, J=13.2, 13.2 Hz, 2H).

Example 6

Synthesis of Compound 9

Compound 9 was synthesized in the same manner as that used for Compound 1 from 3,3-dimethyl-6-phenylindolenine (synthesized by the method described in U.S. Pat. No. 6,004,536).

$^1$H-NMR (CD$_3$OD) δ 1.75 (s, 12H), 2.05–2.15 (m, 4H), 2.45–2.55 (m, 4H), 2.75–2.84 (m, 4H), 3.30 (MeOH), 4.20 (t, J=7.2 Hz, 4H), 4.80 (H$_2$O), 6.38 (J=13.2 Hz, 2H), 6.62 (J=13.2 Hz, 2H), 7.43–7.70 (m, 17H), 7.95 (dd, J=13.2, 13.2 Hz, 2H).

Example 7

Synthesis of Compound 10

Compound 9 was synthesized in the same manner as that used for Compound 1 from 6-bromo-3,3-dimethyl-indolenine.

$^1$H-NMR (CD$_3$OD) δ 1.68 (s, 12H), 2.00–2.15 (m, 4H), 2.40–2.55 (m, 4H), 2.77–2.92 (m, 4H), 3.30 (MeOH), 4.08 (t, J=7.2 Hz, 4H), 4.82 (m, 2H), 6.38 (J=13.2 Hz, 2H), 6.65 (J=13.2 Hz, 2H), 7.30–7.40 (m, 4H), 7.50–7.72 (m, 3H), 7.90–8.02 (m, 2H).

Example 8

Synthesis of Compound 11

Compound 9 was synthesized in the same manner as that used for Compound 1 from 5-phenyl-3,3-dimethyl-indolenine.

$^1$H-NMR (CD$_3$OD) δ 1.78 (s, 12H), 2.39 (s, 3H), 2.70–2.84 (m, 8H), 3.30 (MeOH), 4.30–4.46 (m, 4H), 4.60–4.68 (m, 2H), 6.39 (J=13.2 Hz, 2H), 6.66 (J=13.2 Hz, 2H), 7.307.48 (m, 9H), 7.56–7.72 (m, 3H), 8.05 (J=13.2, 13.2 Hz).

Example 9

Synthesis of Compounds 13 and 14

The synthetic route of Compounds 13 and 14 is shown below.

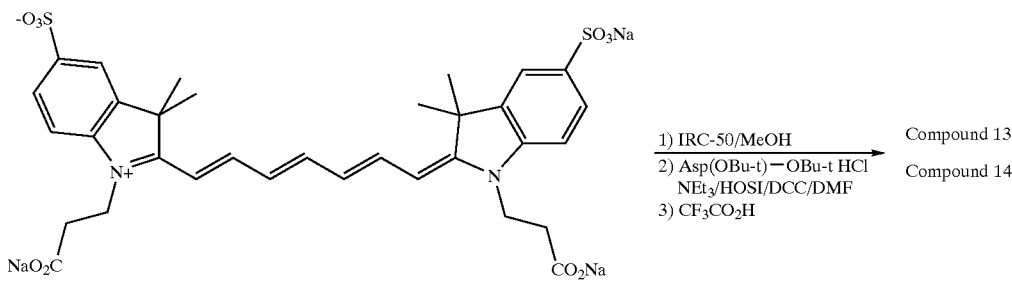

Intermediate 4

An intermediate (375 mg, 0.5 mmol), which was obtained by reacting 5-sulfo-2,3,3-trimethylindolenine (synthesized by the method descescribed in Japanese Patent Unexamined Publication (Kokai) No. 2-233658) and 1,7-diaza-1,7- diphenyl-1,3,5-heptatriene monohydrochloride in the presence of triethylamine and acetic anhydride in methanol, was dissolved in methanol (5 mL) and passed through a carboxylic acid form cation exchange resin IRC-50 (ORGANO CORP.) filled in a column (development solvent:methanol), and then the solvent was evaporated to make the carboxylic acid into a proton form. The product was dissolved in dimethylformamide (3 mL), added with L-aspartic acid di-t-butyl ester hydrochloride (338 mg, 1.2 mmol), dimethylaminopyridine (24 mg, 0.2 mmol) and triethylamine (121 mg, 1.2 mmol) and cooled on ice. The reaction mixture was added with hydroxysuccinimide (HOSI, 230 mg, 2 mmol) and N,N-dicyclohexylcarbodiimide (DCC, 288 mg, 1.4 mmol) and stirred overnight at room temperature. The reaction mixture was added to a mixed solvent of ethyl acetate/hexane (1:1, 200 mL), and the produced crystals were collected by filtration. The crystals were purified by column chromatography (development solvent:methylene chloride:methanol=10:1 to 2:1) to obtain a diamide compound (135 mg) and a monoamide compound (94 mg).

The resulting diamide compound and the monoamide compound (diamide compound: 120 mg, monoamide compound: 60 mg) were each dissolved in trifluoroacetic acid (2 mL), stirred at room temperature for 1 hour, then dissolved in water/methanol (1/1, v/v) and purified by column chromatography (development solvent:methanol) using Sephadex (LH-20, Pharmacia). The crystals obtained were dissolved in a small volume of methanol and added with a saturated potassium acetate solution in methanol, and the produced crystals were collected by filtration to obtain each of Compound 13 (35 mg, yield: 7%) and Compound 14 (15 mg, yield: 5%).

Compound 13

$^1$H-NMR (D$_2$O) δ 1.73 (s, 12H), 2.50–2.65 (m, 4H), 2.68–2.73 (m, 4H), 4.28–4.38 (m, 4H), 4.39–4.50 (m, 2H), 4.90 (D$_2$O), 6.47 (d, J=13.2 Hz, 2H), 6.74 (t, J=13.2 Hz, 2H), 7.40–7.50 (m, 2H), 7.60 (t, J=13.2 Hz, 1H), 7.80–8.05 (m, 6H).

Compound 14

$^1$H-NMR (D$_2$O) δ 1.65 (s, 6H), 1.70 (s, 6H), 2.40 (d, J=7.2 Hz, 2H), 2.58 (t, J=7.2 Hz, 2H), 2.70 (t, J=7.2 Hz, 2H), 4.18–4.30 (m, 4H), 4.90 (D$_2$O), 6.18 (d, J=13, 2 Hz, 1H), 6.34 (d, J=13.2 Hz, 1H), 6.48–6.62 (m, 2H), 7.20 (d, J=7.2 Hz, 1H), 7.30 (d, J=7.2 Hz, 1H), 7.48 (t, J=13.2 Hz, 1H), 7.68–7.95 (m, 6H).

Example 10

Synthesis of Compound 15

The synthetic route of Compound 15 is outlined below.

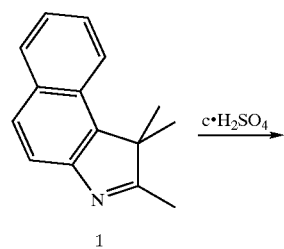

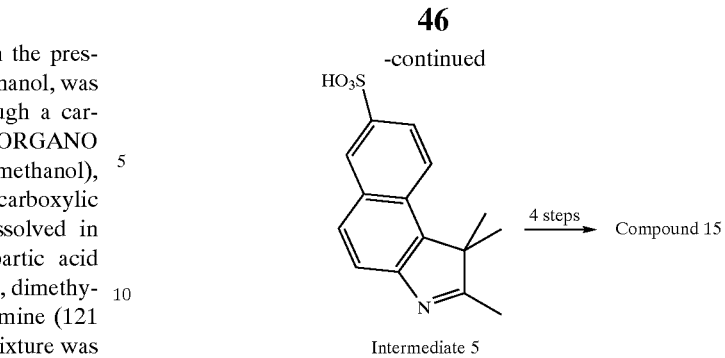

Starting material 1 (41.8 g, 0.2 mol) was dissolved in concentrated sulfuric acid (156 mL, 2.9 mol), allowed to react at 140° C. for 1 hour and then cooled to 80° C. The reaction mixture was added to 300 mL of water and then carefully added with a solution obtained by dissolving sodium hydroxide (96.6 g, 2.4 mol) in water (100 mL). The produced crystals were collected by filtration and washed with water (120 mL). The obtained crude crystals were added with water (300 mL) and methanol (100 mL), refluxed by heating with stirring for 30 minutes and then cooled to room temperature. The crystals were collected by filtration and washed with water (100 mL) and methanol (120 mL) to obtain Intermediate 5 (37.9 g, yield: 66%).

Compound 15 was obtained from Intermediate 5 in the same manner as that used for Compound 13.

$^1$H-NMR (CD$_3$OD) δ 2.00 (s, 12H), 2.72 (d, J=7.2 Hz, 4H), 2.82 (t, J=7.2 Hz, 4H), 3.30 (MeOH), 4.58 (t, J=7.2 Hz, 4H), 4.70 (t, J=7.2 Hz, 4H), 4.86 (H$_2$O), 6.42 (d, J=13.2 Hz, 2H), 6.62 (dd, J=13.2, 13.2 Hz, 2H), 7.62–7.70 (m, 3H), 7.95–8.12 (m, 6H), 8.28 (d, J=7.2 Hz, 2H), 8.42 (s, 2H).

Example 11

Synthesis of Compound 33

The synthetic route of Compound 33 is shown below.

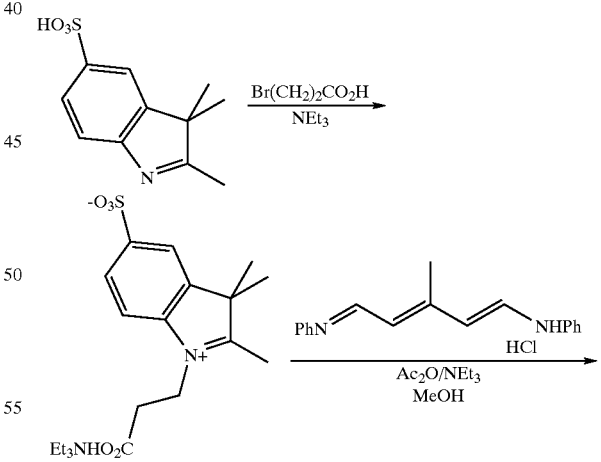

Synthesis of Intermediate 6

5-Sulfo-2,3,3-trimethylindolenine (synthesized by the method described in Japanese Patent Unexamined Publication No. 2-233658, 24.0 g, 0.1 mol), 2-bromopropionic acid (23.0 g, 0.15 mol) and triethylamine (10.1 g, 0.1 mol) were heated at 160° C. for 6 hours with stirring. After the reaction, the reaction mixture was added with methanol (200 mL) and cooled to room temperature, and the produced crystals were collected by filtration to obtain Intermediate 6. Yield: 6.0 g (19.3%).

Synthesis of Compound 33

Intermediate 1 (3.1 g, 10 mmol) obtained above and 1,7-diaza-1,7-diphenyl-4-methyl-1,3,5-heptatriene monohydrochloride (synthesized by the method described in Japanese Patent Unexamined Publication No. 8-295658, 1.5 g, 5 mmol) were dissolved in methanol (20 mL), added with triethylamine (2.5 g, 25 mmol) and acetic anhydride (4.6 g, 45 mmol) and stirred at room temperature for 3 hours. The reaction mixture was added with sodium acetate (3.3 g, 33 mmol) and stirred at room temperature for 30 minutes. The produced crystals were collected by filtration and washed with methanol (20 mL) to obtain Compound 33. Yield: 2.0 g (50.0%).

$^1$H-NMR (D$_2$O) δ (ppm) 1.60 (s, 12H), 2.30 (s, 3H), 2.60 (t, 4H, J=7.2 Hz), 4.20 (t, 4H, J=7.2 Hz), 6.25 (d, 2H, J=14.5 Hz), 6.55 (dd, 2H, 14.5, 14.5 Hz), 7.25 (d, 2H, J=7.0 Hz), 7.70–7.80 (m, 4H), 8.00 (dd, 2H, J=14.5, 14.5 Hz).

Example 12

Synthesis of Compound 35

Compound 35 was synthesized from 5-carboxy-2,3,3-trimethylindolenine in the same manner as that used for Intermediate 1 and Compound 1. Yield: 1.0 g.

MS (FAB+, Glycerin) m/z=691, 669.

Example 13

Synthesis of Compounds 36 and 37

The synthetic route of Compounds 36 and 37 is shown below.

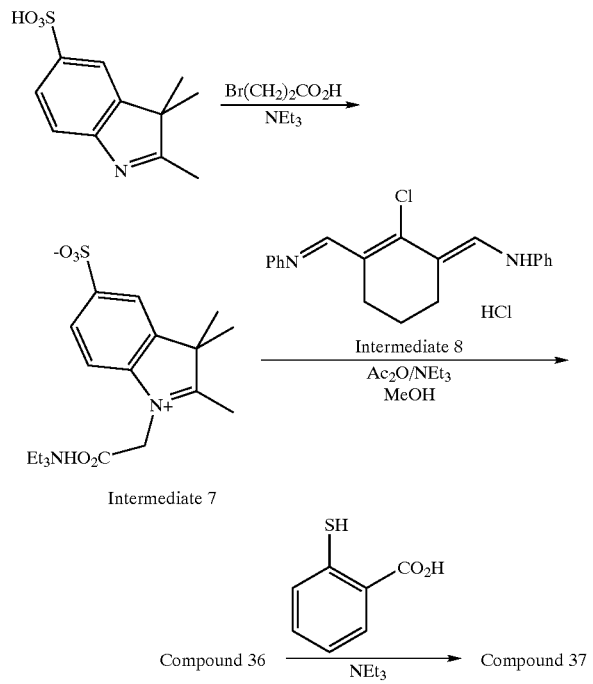

Synthesis of Intermediate 7

Intermediate 7 was synthesized from 5-sulfo-2,3,3-trimethylindolenine and bromoacetic acid in the same manner that used for Intermediate 6. Yield: 16.6 g.

Synthesis of Compound 36

Compound 36 was synthesized from Intermediate 7 and Intermediate 8 (synthesized by the method described in Zh. Org. Khim., 13, pp.1189–1192, 1977) in the same manner as that used for Compound 33. Yield: 15.0 g.

MS (FAB–, Glycerin) m/z=844.

Synthesis of Compound 37

Compound 36 (4.2 g, 5 mmol) and triethylamine (1.0 g) were added to water (20 mL), then added with o-mercaptobenzoic acid (0.93 g, 6 mmol) and stirred at room temperature for 1 hour. The reaction mixture was added with potassium acetate (2.0 g, 20 mmol) and then added with ethanol (20 mL), and the produced crystals were collected by filtration to obtain Compound 37. Yield: 1.3 g (27%).

MS (FAB–, Glycerin) m/z=962.

Example 14

Synthesis of Compound 43

The synthetic route of Compound 43 is shown below.

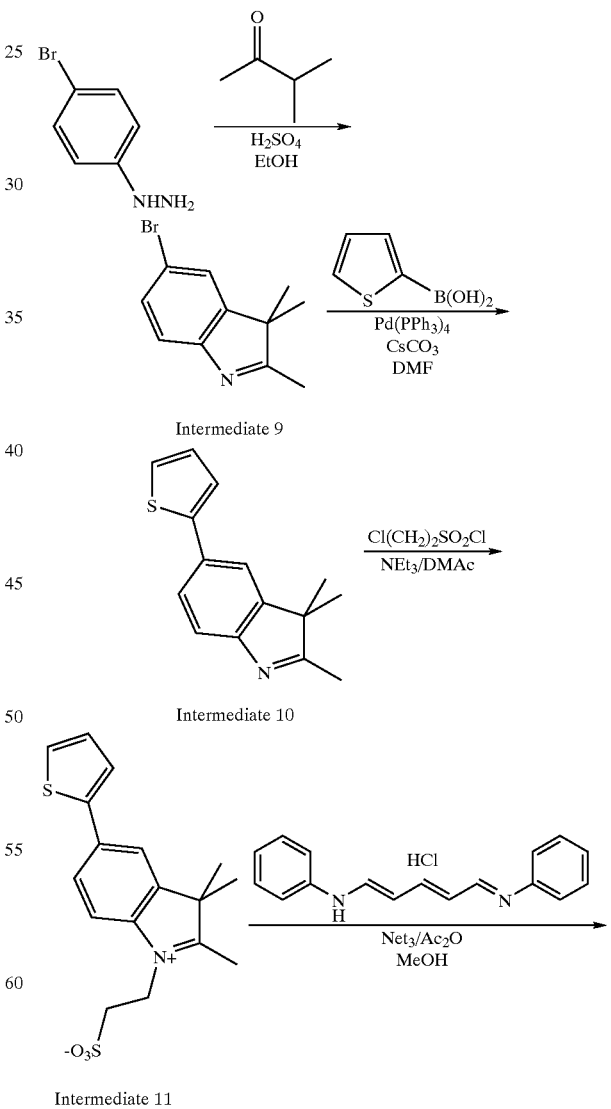

Synthesis of Intermediate 9

4-Bromophenylhydrazine monohydrochloride (73.8 g, 0.33 mol) and 3-methyl-2-butanone (33.2 g, 0.40 mol) were dissolved in ethan concentrated sulfuric acid (7.5 mL) and refluxed by heating for 8 hours with stirring. The reaction mixture was cooled to room temperature and then concentrated to a volume of about 100 mL under reduced pressure. The reaction mixture was added with water (400 mL) and ethyl acetate (400 mL), and the aqueous phase was adjusted to pH 7 to 8 with aqueous sodium hydroxide. This solution was extracted with ethyl acetate, and the organic layer was washed with saturated brine, dried over anhydrous sodium sulfate and concentrated under reduced pressure. The residue was purified by silica gel column chromatography (development solvent:hexane:ethyl acetate=5:1 to 1:1) to obtain Intermediate 9 as brown liquid. Yield: 58.6 g (76%).

Synthesis of Intermediate 10

Intermediate 9 (4.76 g, 20 mmol) and 2-thiopheneboronic acid (3.84 g, 30 mmol) were added to dimethylformamide (50 mL), added with palladium tetrakistriphenylphosphine (1.16 g, 1 mmol) and cesium chloride (13.3 g, 40 mmol) and stirred at 100° C. for 4 hours with heating. The reaction mixture was added with water (200 mL) and then extracted with ethyl acetate (200 mL), and the organic layer was washed with saturated brine, dried over anhydrous sodium sulfate and concentrated under reduced pressure. The residue was purified by silica gel column chromatography (development solvent:hexane:ethyl acetate=2:1 to 1:1) to obtain Intermediate 10 as brown solid. Yield: 2.80 g (58%)

Synthesis of Intermediate 11

Intermediate 10 (1.40 g, 6 mmol) and triethylamine (0.59 g, 6 mmol) were added to dimethylformamide (3 mL) and added dropwise little by little with 2-chloroethanesulfonyl chloride (1.42 g, 9 mmol) with water cooling. The reaction mixture was stirred at room temperature for 30 minutes, added with a solution obtained by dissolving sodium hydroxide (0.23 g, 6 mmol) in water (2 mL) and stirred at room temperature for 1 hour. The reaction mixture was added with ethyl acetate (50 mL), the supernatant was removed by decantation, and the residue was dried to obtain Intermediate 11. Intermediate 11 was used for the subsequent reaction without further purification.

Synthesis of Compound 43

Intermediates 11 obtained above and 1,7-diaza-1,7-diphenyl-1,3,5-heptatriene monohydrochloride (142 mg, 0.5 mmol) were dissolved in methanol (5 mL), added with triethylamine (160 mg, 2 mmol) and acetic anhydride (230 mg, 2 mmol) and stirred at room temperature for 7 hours. The mixture was added with ethyl acetate (20 mL), and the produced crystals were collected by filtration and washed with ethyl acetate (10 mL). The crystals were dissolved in methanol (10 mL) and then added with a saturated solution of potassium acetate in methanol (10 mL), and the produced crystals were collected by filtration and washed with methanol (5 mL). The crystals were purified by using Sephadex LH-20 (eluent:methanol) to obtain Compound 43.

Yield: 15 mg (2%), from Intermediate 2.

$^1$H-NMR (CD$_3$OD) δ (ppm) 1.75 (s, 12H), 3.25 (t, 4H, J=7.2 Hz), 4.50 (t, 4H, J=7.2 Hz), 6.40 (d, 2H, J=14.5 Hz), 6.63 (dd, 2H, 14.5, 14.5 Hz), 7.07–7.12 (m, 2H), 7.33–7.45 (m, 6H), 7.53–7.75 (m, 5H), 7.96 (dd, 2H, J=14.5, 14.5 Hz).

MS (FAB–, Glycerin) m/z=760.

Example 14

Synthesis of Compound 44

The synthetic route of Compound 44 is shown below.

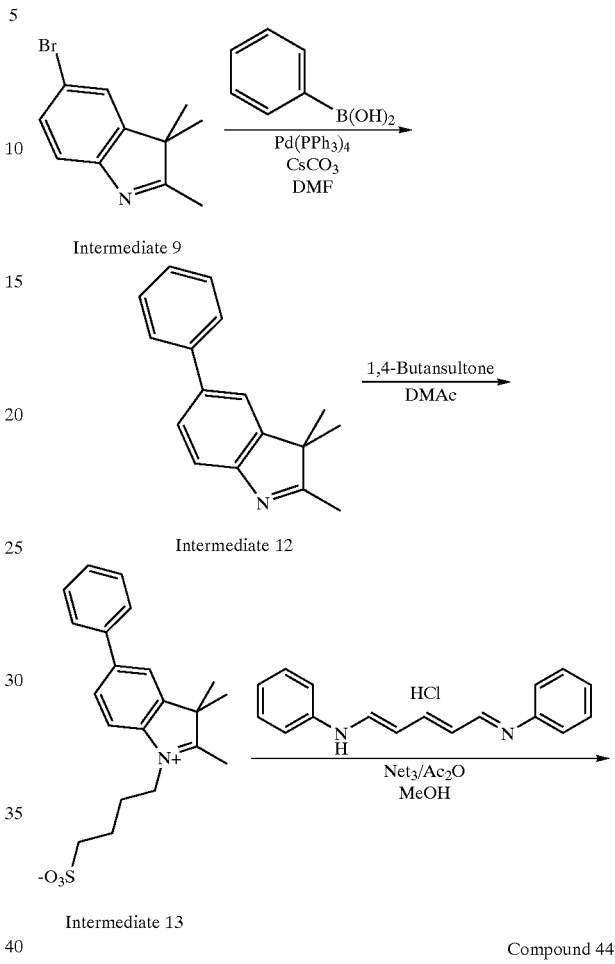

Synthesis of Intermediate 12

Intermediate 12 was synthesized from Intermediate 9 and dihydroxyphenylborane in the same manner as that used for Intermediate 10. Yield: 3.6 g (77%).

Synthesis of Intermediate 13

Intermediate 12 (1.40 g, 6 mmol) and 1,4-butanesultone (1.22 g, 9 mmol) were dissolved in dimethylacetamide (2 mL) and stirred with heating at 135° C. for 5 hours. The reaction mixture was added with ethyl acetate (20 mL) and cooled to room temperature, and then the produced crystals were collected by filtration and washed with ethyl acetate (10 mL). Yield: 1.84 g (84%).

Synthesis of Compound 44

Intermediate 13 (1110 mg, 3 mmol) and 1,7-diaza-1,7-diphenyl-1,3,5-heptatriene monohydrochloride (285 mg, 1 mmol) were dissolved in methanol (5 mL), added with triethylamine (480 mg, 5 mmol) and acetic anhydride (670 mg, 7 mmol) and stirred at room temperature for 7 hours. The reaction mixture was added with ethyl acetate (50 mL), and the produced crystals were collected by filtration and washed with ethyl acetate (10 mL). The crystals were dissolved in methanol (5 mL) and added with a saturated potassium acetate solution in methanol (10 mL), and the produced crystals were collected by filtration and washed with methanol (5 mL). The crystals were purified by using Sephadex LH-20 (eluent:methanol) to obtain Compound 44. Yield: 250 mg (30%).

$^1$H-NMR (CD$_3$OD) δ (ppm) 1.80 (s, 12H), 1.95–2.05 (m, 8H), 2.90 (t, 4H, J=7.2 Hz), 4.20 (t, 4H, J=7.2 Hz), 6.38 (d, 2H, J=14.5 Hz), 6.62 (dd, 2H, 14.5, 14.5 Hz), 7.30–7.48 (m, 8H), 7.60–7.74 (m, 9H), 7.93 (dd, 2H, J=14.5, 14.5 Hz).

MS (FAB–, Nitrobenzylalcohol) m/z=803.

Example 16

Synthesis of Compound 45

Compound 45 was synthesized from Intermediate 9 and 4-methylmercaptophenylboronic acid by the same synthetic method as used for Compound 44. Yield: 15 mg.

$^1$H-NMR (CD$_3$OD) δ (ppm) 1.68 (s, 12H), 1.95–2.10 (m, 8H), 2.50 (s, 6H), 3.00 (t, 4H, J=7.2 Hz), 4.10 (t, 4H, J=7.2 Hz), 6.30 (d, 2H, J=14.5 Hz), 6.62 (dd, 2H, 14.5, 14.5 Hz), 7.20–7.70 (m, 19H).

Example 17

Synthesis of Compound 46

The synthetic route of Compound 46 is shown below.

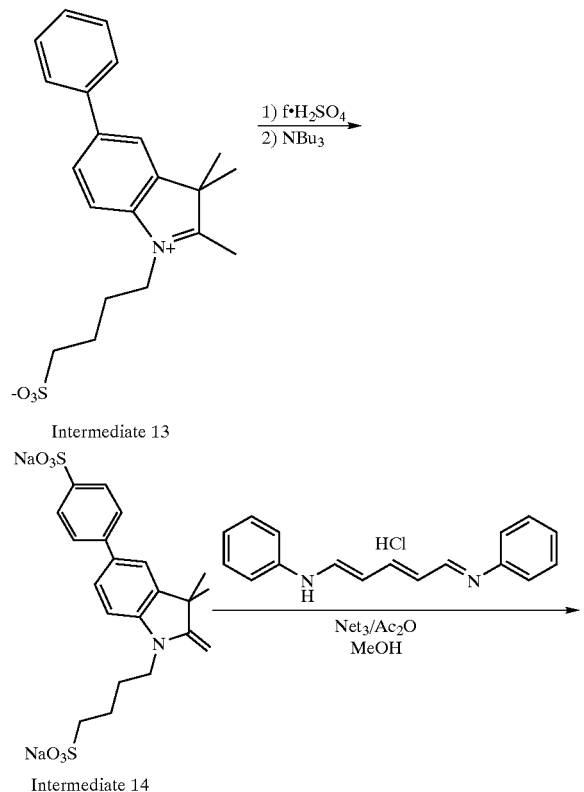

Compound 46

Synthesis of Intermediate 14

Intermediate 13 (740 mg, 2 mmol) was dissolved in concentrated sulfuric acid (10 mL) at room temperature, then cooled on ice and added dropwise little by little with 30% fuming sulfuric acid (3.8 mL). After the addition, the reaction mixture was stirred with ice cooling for 10 minutes and poured into ice water (200 mL). This mixture was neutralized with sodium hydroxide to pH 3 to 4. The reaction mixture was added with methylene chloride (200 mL) and then added with tributylamine until pH of the aqueous phase became 7 to 8. The methylene chloride layer was separated, dried over sodium sulfate and concentrated under reduced pressure. The residue was added with methanol (5 mL), dissolved in it and then added with a saturated potassium acetate solution in methanol (5 mL), and the produced crystals were collected by filtration. Yield: 560 mg (57%).

Synthesis of Compound 46

Compound 46 was synthesized from Intermediate 14 and 1,7-diaza-1,7-diphenyl-1,3,5-heptatriene monohydrochloride in the same manner as that used for Compound 43. Yield: 20 mg.

$^1$H-NMR (D$_2$O) δ (ppm) 1.45 (s, 12H), 1.70–1.95 (m, 8H), 2.90 (t, 4H, J=7.2 Hz), 3.95.4.10 (m, 4H), 5.96 (d, 2H, J=14.5 Hz), 6.28 (dd, 2H, 14.5, 14.5 Hz), 7.15–7.26 (m, 3H), 7.46–7.65 (m, 14H).

Example 18

Synthesis of Compound 47

The synthetic route of Compound 47 is shown below.

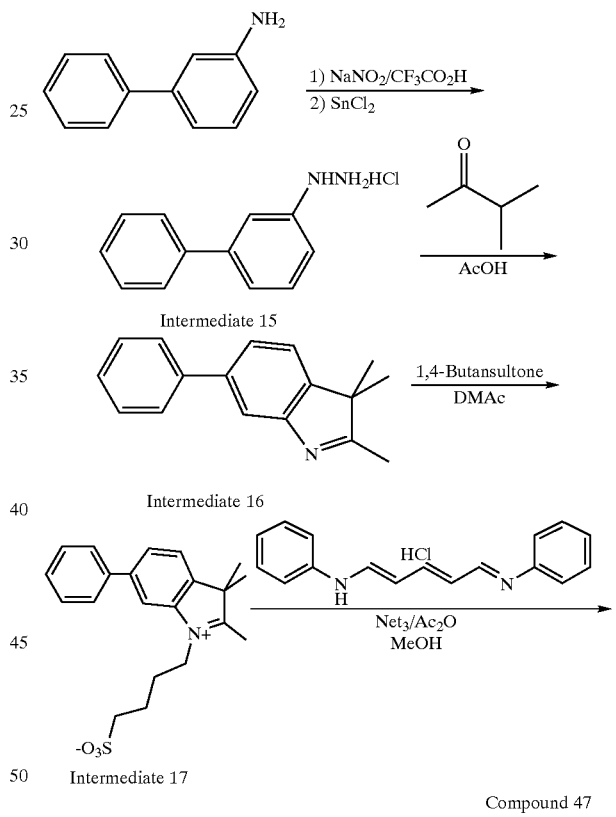

Compound 47

Synthesis of Intermediate 15

3-Aminodiphenyl (25.0 g, 0.15 mol) was added to trifluoroacetic acid (100 mL) and cooled at 0° C. as the internal temperature with ice/methanol. The reaction mixture was added dropwise with a solution obtained by dissolving sodium nitrite (10.2 g, 0.15 mol) in water (100 mL), while the temperature of the reaction mixture was kept at 5° C. or lower. After the addition, the reaction mixture was stirred at the same temperature for 15 minutes and then added dropwise with a solution obtained by dissolving stannous chloride (100 g, 0.54 mol) in concentrated hydrochloric acid (50 mL), while the reaction mixture was kept at 10° C. or lower. After the addition, the reaction mixture was added with water (250 mL), and the deposited crystals were collected by filtration and washed with methylene chloride (200 mL). The obtained Intermediate 15 was dried and then the product, per se, was used for synthesis of Intermediate 8.

Synthesis of Intermediate 16

Intermediate 15 obtained above (whole amount) and 3-methyl-2-butanone (12.9 g, 0.15 mol) were added to acetic acid (140 mL) and stirred with heating at 110° C. for 2 hours and 30 minutes. The reaction mixture was cooled to room temperature, then the produced crystals were removed by filtration, and the filtrate was concentrated under reduced pressure to an about ¼ volume. The residue was added with water (300 mL) and ethyl acetate (300 mL), and the produced insoluble matter was removed by filtration using Cerite. The filtrate was extracted with ethyl acetate (300 mL, 200 mL×2), and the organic layer was washed with saturated aqueous sodium hydrogencarbonate and saturated brine and dried over sodium sulfate, and the solvent was evaporated under reduced pressure. The residue was purified by silica gel column chromatography (development solvent:hexane: ethyl acetate=3:1 to 2:1). The obtained crystals were recrystallized from hexane (50 mL) to obtain Intermediate 16. Yield: 1.3 g (4%).

Synthesis of Compound 47

Compound 47 was synthesized from Intermediate 16 in the same manner as that used for Intermediate 13 and Compound 44. Yield: 65 mg.

MS (FAB−, Glycerin) m/z=842, 804.

$^1$H-NMR (D$_2$O) δ (ppm) 1.70 (s, 12H), 1.90–2.00 (m, 8H), 2.90 (t, 4H, J=7.2 Hz), 4.10 (t, 4H, J=7.2 Hz), 6.22 (d, 2H, J=14.5 Hz), 6.55 (dd, 2H, 14.5, 14.5 Hz), 7.30–7.60 (m, 17H), 7.77 (dd, 2H, J=14.5, 14.5 Hz).

Example 19

Synthesis of Compound 48

Compound 48 was synthesized from Intermediate 17 in the same manner as that used for Compound 3. Yield: 55 mg.

$^1$H-NMR (D$_2$O) δ (ppm) 1.45 (s, 12H), 1.85–2.00 (m, 8H), 3.00 (t, 4H, J=7.2 Hz), 3.92 (t, 4H, J=7.2 Hz), 6.12 (d, 2H, J=14.5 Hz), 6.50 (dd, 2H, 14.5, 14.5 Hz), 7.15–8.00 (m, 17H).

Example 20

Synthesis of Compound 18

The synthetic route of Compound 18 is shown below.

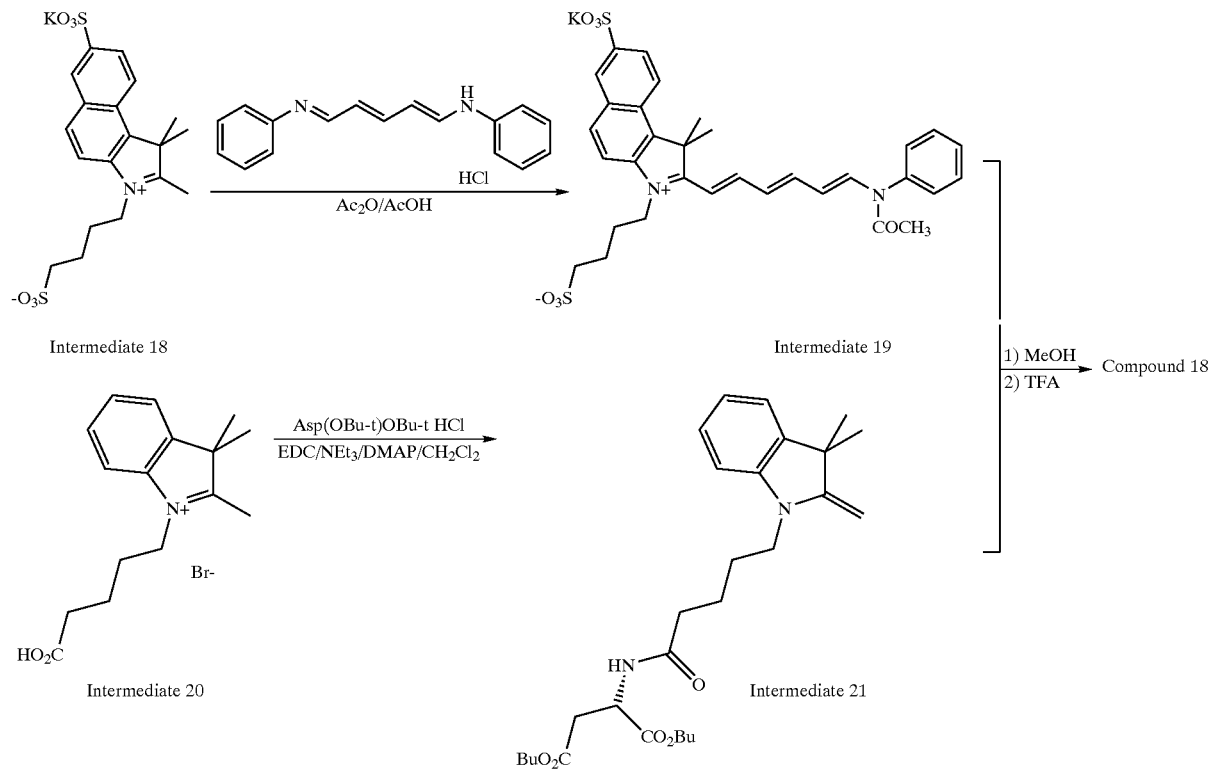

Synthesis of Intermediate 18

Intermediate 5 (5.70 g, 0.02 mol), triethylamine (2.02 g, 0.02 mol) and 1,4-butanesultone (5.45 g, 0.04 mol) were added to sulfolane (5 mL), allowed to react at 150° C. for 12 hours and then added with acetone (100 mL), and the supernatant was removed by decantation. The residue was added with methanol (30 mL), dissolved in it and then added with a saturated potassium acetate solution in methanol (50 mL), and the produced crystals were collected by filtration to obtain Intermediate 19.

Yield: 7.45 g (80%).

Synthesis of Intermediate 19

Intermediate 18 (3.24 g, 7 mmol) and 1,7-diaza-1,7-diphenyl-1,3,5-heptatriene monohydrochloride (1.42 g, 5 mmol) were added to acetic anhydride (20 mL) and acetic acid (5 mL) and allowed to react at 80 for 30 minutes. The reaction mixture was added to ethyl acetate (300 mL), and the produced crystals were collected by filtration to obtain Intermediate 19. Yield: 3.3 g (100%).

Synthesis of Intermediate 21

Intermediate 20 (1.00 g, 2.9 mmol) obtained from 2,3,3-trimethylindolenine and 5-bromovaleric acid, L-aspartic acid di-t-butyl ester hydrochloride (1.24 g, 4.4 mmol), dimethylaminopyridine (34 mg, 0.3 mmol), 1-ethyl-3-(3-dimethylaminopropyl)carbodiimide hydrochloride (EDC, 0.68 g, 3.5 mmol) and triethylamine (0.33 g, 3.2 mmol) were added to methylene chloride (20 mL) and allowed to react at room temperature for 7 hours. The reaction mixture was added with methylene chloride (150 mL) and water (150 mL), and the methylene chloride layer was separated. The methylene chloride layer was washed with saturated brine (100 mL), and the solvent was evaporated to obtain Intermediate 21. Yield: 1.2 g (85%).

Synthesis of Compound 19

Intermediate 19 (330 mg, 0.5 mmol), Intermediate 21 (490 mg, 1 mmol) and triethylamine (300 mg, 3 mmol) were added to methanol (5 mL) and allowed to react overnight at room temperature. The reaction mixture was directly subjected to purification using Sephadex ($LH_2O$, eluent:methanol). The obtained dye was added with trifluoroacetic acid (5 mL) and allowed to react at room temperature for 15 minutes. The trifluoroacetic acid was concentrated under reduced pressure, then the residue was added with acetone (20 mL), and the produced crystals were collected by filtration. The crystals were purified by using Sephadex ($LH_2O$, eluent:methanol) to obtain Compound 19. Yield: 10 mg.

$^1$H-NMR ($CD_3OD$) δ (ppm) 1.71 (s, 6H), 1.73–1.90 (m, 4H), 1.98 (s, 6H), 2.00–2.13 (m, 4H), 2.33 (t, J=7.2 Hz, 2H), 2.65 (t, J=7.2 Hz, 2H), 2.91 (t, J=7.2 Hz, 2H), 4.00–4.28 (m, 4H), 4.50 (t, J=7.2 Hz, 4H), 6.36 (d, J=13.2 Hz, 2H), 6.61 (dd, J=13.2, 13.2 Hz, 2H), 7.207.48 (m, 4H), 7.54–7.68 (m, 2H), 7.90–8.10 (m, 4H), 8.25 (d, J=6.9 Hz, 1H), 8.42 (s, 1H).

Example 21

Synthesis of Compound 49

Intermediate 19 (330 mg, 0.5 mmol), Intermediate 17 (371 mg, 1 mmol), triethylamine (300 mg, 3 mmol) and acetic anhydride (300 mg, 3 mmol) were added to methanol (5 mL) and allowed to react at room temperature for 2 hours. The reaction mixture was directly subjected to purification using Sephadex ($LH_2O$, eluent:methanol) to obtain Compound 49. Yield: 18 mg.

$^1$H-NMR ($CD_3OD$) δ (ppm) 1.71 (s, 6H), 1.90–2.10 (m, 8H), 1.97 (s, 6H), 2.87–2.95 (m, 4H), 4.10–4.30 (m, 4H), 6.38–6.45 (m, 2H), 6.62 (d, J=13.2 Hz, 2H), 7.32–7.70 (m, 10H), 7.90–8.10 (m, 4H), 8.27 (d, J=6.9 Hz, 1H), 8.42 (s, 1H).

Test Example 1

1. Preparation of Silver Halide Emulsions

To a vessel containing 34 g of gelatin dissolved in 850 mL of water and warmed at 65° C., 1.7 g of sodium chloride, 0.1 g of potassium bromide and 70 mg of Compound (A) [$HO-(CH_2)_2-S-(CH_2)_2-S-(CH_2)_2-OH$] were added, and then 500 mL of an aqueous solution containing 170 g of silver nitrate and 500 mL of an aqueous solution containing potassium hexachloroiridate(III) in such an amount that the molar ratio of iridium based on silver halide in the final emulsion became $5 \times 10^{-7}$, 12 g of sodium chloride and 98 g of potassium bromide were further added to the mixture by the double jet method to prepare monodispersed cubic silver chlorobromide grains having a mean grain size of 0.35 μm. After desalting, the emulsion was added with 50 g of gelatin, adjusted to pH 6.5 and pAg 8.1, added with 2.5 mg of sodium thiosulfate and 5 mg of chloroauric acid, subjected to chemical sensitization at 65° C., then added with 0.2 g of 4-hydroxy-6-methyl-1,3,3a,7-tetrazaindene and rapidly cooled for solidification (Emulsions A).

Then, monodispersed cubic silver chlorobromide grains having a mean grain size of 0.3 μm were prepared in the same manner as that used for Emulsion A, except that the gelatin solution was warmed to 40° C., subjected to a desalting treatment, added with 50 g of gelatin and adjusted to pH 6.5 and pAg 8.1. The resulting emulsion was added with 2.5 mg of sodium thiosulfate and 5 mg of chloroauric acid, subjected to chemical sensitization at 65° C., then added with 0.2 g of 4-hydroxy-6-methyl-1,3,3a,7-tetrazaindene and rapidly cooled for solidification to prepare Emulsions B.

2. Preparation for Emulsion Coating Solution

Emulsions A and B were mixed at a weight ratio of 1:1 and added with the following additives in the indicated amounts per mol of silver halide to prepare an emulsion coating solution.

(Composition of Emulsion Coating Solution)

| (Compositiion of emulsion coating solution) | |
|---|---|
| a. Spectral sensitization dye [2] | $1.0 \times 10^{-4}$ mol |
| b. Supersensitizer [3] | $0.7 \times 10^{-3}$ mol |
| c. Storability improving agent [4] | $1 \times 10^{-3}$ mol |
| d. Polyacrylamide (molecular weight: 40,000) | 7.5 g |
| e. Dextran | 7.5 g |
| f. Trimethylolpropane | 1.6 g |
| g. Sodium polystyrenesulfonate | 1.2 g |
| h. Latex of poly(ethyl acrylate/methacrylic acid) | 12 g |
| i. N,N'-Ethylenebis(vinylsulfoneacetamide) | 3.0 g |
| j. 1-Phenyl-5-mercaptotetrazole | 50 mg |

Spectral sensitization dye [2]

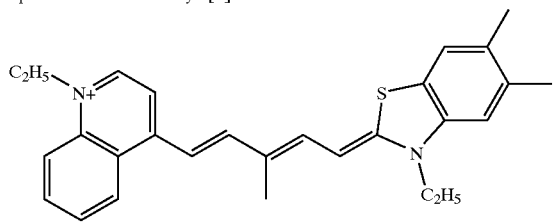

Supersensitizer [3]

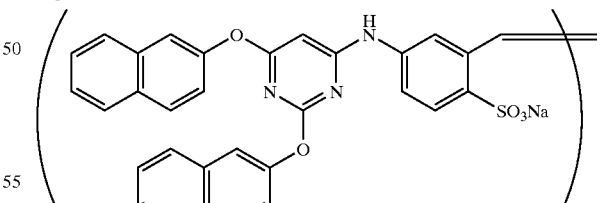

Storability improving agent [4]

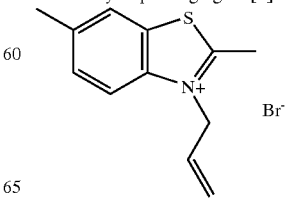

3. Preparation of coating solution for surface protective layer for emulsion layer A vessel was warmed at 40° C. and added with additives in the composition mentioned below to prepare a coating solution.

(Composition of Coating Solution for Surface Protective Layer for Emulsion Layer)

| (Composition of coating solution for surface protective layer for emulsion layer) | |
|---|---|
| a. Gelatin | 100 g |
| b. Polyacrylamide (molecular weight: 40,000) | 12 g |
| c. Sodium polystyrenesulfonate (molecular weight: 600,000) | 0.6 g |
| d. N,N'-ethylenebis(vinylsulfoneacetamide) | 2.2 g |
| e. Polymethylmethacrylate microparticles (mean particle size: 2.0 μm) | 2.7 g |
| f. Sodium t-octylphenoxyethoxyethanesulfonate | 1.8 g |
| g. $C_{16}H_{33}O-(CH_2CH_2O)_{10}-H$ | 4.0 g |
| h. Sodium polyacrylate | 6.0 g |
| i. $C_8F_{17}SO_3K$ | 70 mg |
| j. $C_8F_{17}SO_2N(C_3H_7)(CH_2CH_2O)_4(CH_2)_4-SO_3Na$ | 70 mg |
| k. NaOH (1 N) | 6 mL |
| l. Methanol | 90 mL |
| m. Antifoggant Compound X | 0.06 g |

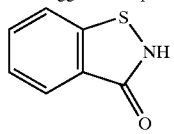

4. Preparation of Coating Solution for Back Layer

A vessel was warmed at 40° C. and added with additives in the composition mentioned below to prepare a coating solution for back layer.

(Composition of Coating Solution for Back Layer)

| (Composition of coating solution for back layer) | |
|---|---|
| a. Gelatin | 100 g |
| b. Dye A (Compound 3 of the present invention) | 4.2 g |
| c. Sodium polystyrenesulfonate | 1.2 g |
| d. Latex of poly(ethyl acrylate/methacrylic acid) | 5 g |
| d. N,N'-ethylenebis(vinylsulfoneacetamide) | 4.8 g |
| e. Antifoggant Compound X | 0.06 g |
| f. Dye [B] | 0.3 g |
| g. Dye [C] | 0.05 g |
| h. Colloidal silica | 15 g |

Dye [B]

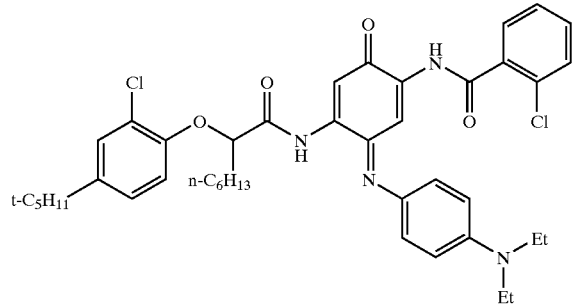

Dye [C]

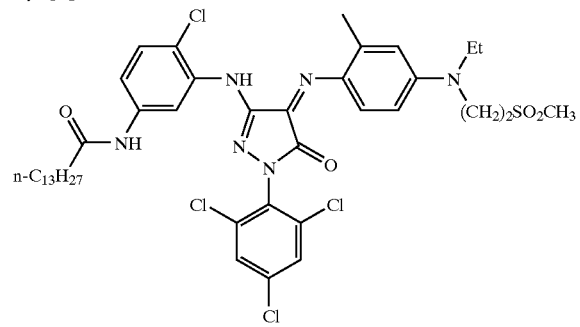

5. Preparation of Coating Solution for Surface Protective Layer for Back Layer

A vessel was warmed at 40° C. and added with additives in the composition mentioned below to prepare a coating solution.

(Composition of Coating Solution for Surface Protective Layer for Back Layer)

| (Composition of coating solution for surface protective layer for back layer) | |
|---|---|
| a. Gelatin | 100 g |
| b. Sodium polystyrenesulfonate | 0.5 g |
| c. N,N'-ethylenebis(vinylsulfoneacetamide) | 1.9 g |
| d. Polymethylmethacrylate microparticles (mean particle size: 4.0 μm) | 4 g |
| e. Sodium t-octylphenoxyethoxyethanesulfonate | 2.0 g |
| f. NaOH (1 N) | 6 mL |
| g. Sodium polyacrylate | 2.4 g |
| h. $C_{16}H_{33}O-(CH_2CH_2O)_{10}-H$ | 4.0 g |
| i. $C_8F_{17}SO_3K$ | 70 mg |
| j. $C_8F_{17}SO_2N(C_3H_7)(CH_2CH_2O)_4(CH_2)_4-SO_3Na$ | 70 mg |
| k. Methanol | 150 mL |
| l. Antifoggant Compound X | 0.06 g |

6. Preparation of Photographic Materials

The aforementioned coating solution for back layer was coated together with the coating solution for surface protective layer for back layer on a surface of a polyethylene terephthalate support so as to give the total coated gelatin amount of 3 g/m². Then, on the opposite side of the support, the aforementioned emulsion coating solution and the coating solution for surface protective layer were coated so as to give coated Ag amount of 2.3 g/m² and the coated gelatin amount in the surface protective layer of 1 g/m² (Photographic material 1). Furthermore, Photographic materials 2, 3 and 4 were prepared in the same manner except that the compounds of the present invention (13, 30 and 44) were used respectively instead of Dye [A] in the same amount.

Photographic materials 1 to 4 were exposed for $10^{-7}$ second by scanning with a semiconductor laser of an emission wavelength of 783 nm and subjected to a development treatment by using Developer [I] and Fixer [I] mentioned below in a roller transportation type automatic processor. The development time was 7 seconds, fixation time was 7 seconds, washing time with water was 4 seconds, and dewatering and drying time was 11 seconds. The transportation speed was 3000 mm/minute.

| Composition of Developer [I] | |
| --- | --- |
| Potassium hydroxide | 29 g |
| Sodium sulfite | 31 g |
| Potassium Sulfite | 44 g |
| Ethylenetriaminetetraacetic acid | 1.7 g |
| Boric acid | 1 g |
| Hydroquinone | 30 g |
| Diethylene Glycol | 29 g |
| 1-Phenyl-3-pyraszolidone | 1.5 g |
| Glutaraldehyde | 4.9 g |
| 5-Methylbenzotriazol | 60 mg |
| 5-Nitroindazole | 0.25 g |
| Potassium bromide | 7.9 g |
| Acetic acid | 18 g |
| Water | up to 1000 ml |
| pH 10.3 | |
| Composition of Fixer [I] | |
| Ammonium thiosulfate | 140 g |
| Sodium sulfite | 15 g |
| Disodium ethylenediaminetetraacetate dihydrate | 20 mg |
| Sodium hydroxide | 7 g |
| Aluminum sulfate | 10 g |
| Boric acid | 10 g |
| Sulfuric acid | 3.9 g |
| Acetic acid | 15 g |
| Water | up to 1000 ml |
| pH 4.30 | |

Evaluation of image quality was carried out on the basis of five grades from 1 (many fringes and extremely bad image quality) to 5 (no fringe and sharp image). Evaluation of residual color was conducted on the basis of five grades from 1 (extremely strong residual color) to 5 (completely no residual color). The results obtained are shown in Table 1. From the results shown in Table 1, it is clearly understood that the silver halide photographic light-sensitive materials containing the compounds of the present invention have advantages in that they successfully give images with excellent quality after exposure with a light of a wavelength in the infrared region and the development, and also give little residual color after the development.

TABLE 1

| Photograph material | Compound of the present invention | Image quality | Residual color after development | Note |
| --- | --- | --- | --- | --- |
| 1 | 3 | 5 | 4 | Invention |
| 2 | 13 | 5 | 5 | Invention |
| 3 | 33 | 5 | 5 | Invention |
| 4 | 47 | 5 | 4 | Invention |

Industrial Applicability

The compounds of the present invention are useful for the manufacture of silver halide photographic light-sensitive materials, and they can be formulated in, for example, a hydrophilic colloid layer or the like. By using the compounds of the present invention, silver halide photographic light-sensitive materials can be provided which give images with excellent quality after exposure with a light of a wavelength in an infrared region and development, and also give little residual color after development.

What is claimed is:

1. A compound represented by the following formula (I) or a salt thereof:

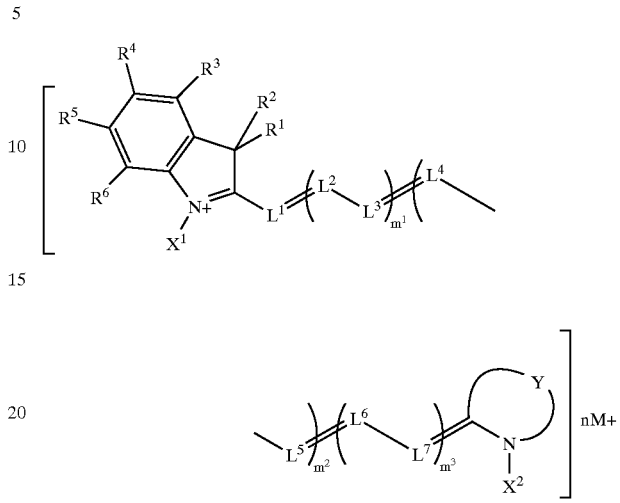

wherein $R^1$ and $R^2$ each independently represent a substituted or unsubstituted alkyl group having 1 to 10 carbon atoms or a substituted or unsubstituted aryl group, and $R^1$ and $R^2$ may bind to each other to form a ring; $R^3$, $R^4$, $R^5$ and $R^6$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and two of adjacent groups selected from the group consisting of $R^3$, $R^4$, $R^5$ and $R^6$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$ and $R^6$ represents a substituted or unsubstituted aryl group or a substituted or unsubstituted heteroaryl group; $L^1$, $L^2$, $L^3$, $L^4$, $L^5$, $L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ represents a substituted methine group, and $R^4$ represents a sulfo group; M represents a hydrogen atom, a metal or a quaternary ammonium salt; Y represents nonmetallic elements required to form a 5- to 10-membered heterocyclic ring wherein said heterocyclic ring may be a condensed ring; and n represents an integer of 1 to 7 required to neutralize charge, wherein $m^1$, $m^2$ and $m^3$ all represent 1.

2. A compound represented by the following formula (I) or a salt thereof:

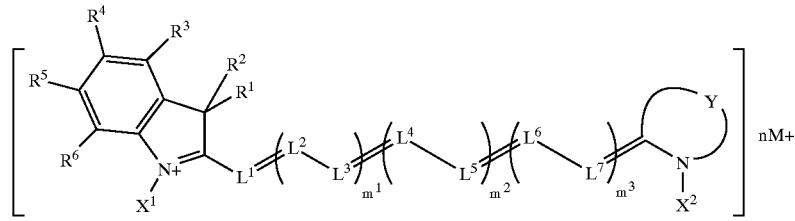

wherein $R^1$ and $R^2$ each independently represent a substituted or unsubstituted alkyl group having 1 to 10 carbon atoms or a substituted or unsubstituted aryl group, and $R^1$ and $R^2$ may bind to each other to form a ring; $R^3$, $R^4$, $R^5$ and $R^6$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and two of adjacent groups selected from the group consisting of $R^3$, $R^4$, $R^5$ and $R^6$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is 4 or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$ and $R^6$ represents a substituted or unsubstituted aryl group or a substituted or unsubstituted heteroaryl group; $m^1$ represents 0 or 1; $m^2$ represents 0 or 1; $m^3$ represents 0 or 1; $L^1$, $L^2$, $L^3$, $L^4$, $L^5$, $L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ represents a substituted methine group, and $R^4$ represents a sulfo group; M represents a hydrogen atom, a metal or a quaternary ammonium salt; Y represents nonmetallic elements required to form a 5- to 10-membered heterocyclic ring wherein said heterocyclic ring may be a condensed ring; and n represents an integer of 1 to 7 required to neutralize charge, wherein $X^1$ is a group represented by the following formula (i):

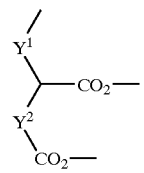

wherein $Y^1$ and $Y^2$ each independently represent a substituted or unsubstituted divalent bridging group.

3. The compound or the salt thereof according to claim 1, wherein $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$ and $R^6$ represents a substituted or unsubstituted aryl group or a substituted or unsubstituted heteroaryl group.

4. A compound represented by the following formula (II) or a salt thereof:

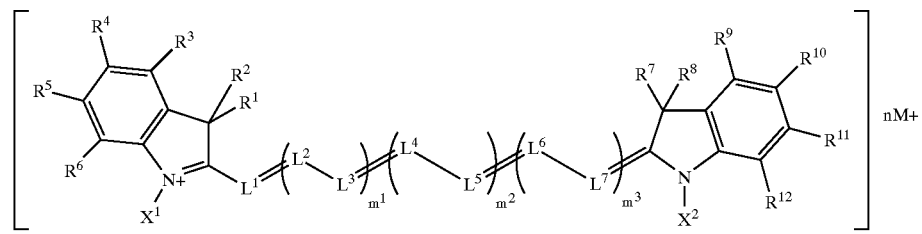

wherein $R^1$, $R^2$, $R^7$ and $R^8$ each independently represent a substituted or unsubstituted alkyl group having 1 to 10 carbon atoms or a substituted or unsubstituted aryl group, and $R^1$ and $R^2$ and/or $R^7$ and $R^8$ may bind to each other to form a ring; $R^3$, $R^4$, $R^5$, $R^6$, $R^9$, $R^{10}$, $R^{11}$ and $R^{12}$ each independently represent a hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and $R^3$, $R^4$, $R^5$, $R^6$, $R^9$, $R^{10}$, $R^{11}$ and $R^{12}$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$, $R^6$, $R^9$, $R^{10}$, $R^{11}$ and $R^{12}$ represents a substituted or unsubstituted aryl group or a substituted or unsubstituted heteroaryl group; $L^1$, $L^2$, $L^3$, $L^4$, $L^5$, $L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ is a substituted methine group, and $R^4$ and $R^{10}$ each represents a sulfo group; M represents a hydrogen atom, a metal or a quaternary ammonium salt; and n represents an integer of 1 to 7 required to neutralize charge, wherein $m^1$, $m^2$ and $m^3$ all represent 1.

5. A compound represented by the following formula (II) or a salt thereof:

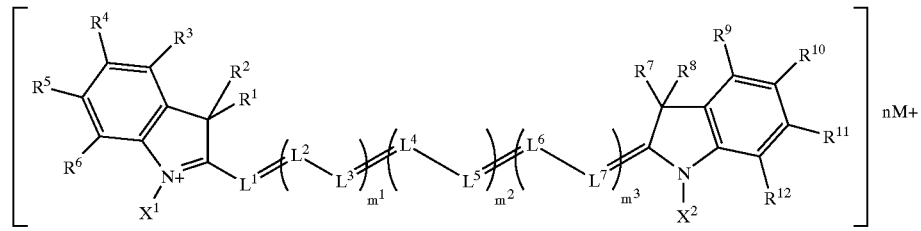

wherein $R^1$, $R^2$, $R^7$ and $R^8$ each independently represent a substituted or unsubstituted alkyl group having 1 to 10 carbon atoms or a substituted or unsubstituted aryl group, and $R^1$ and $R^2$ and/or $R^7$ and $R^8$ may bind to each other to form a ring; $R^3$, $R^4$, $R^5$, $R^6$, $R^9$, $R^{10}$, $R^{11}$ and $R^{12}$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and $R^3$, $R^4$, $R^5$, $R^6$, $R^9$, $R^{10}$, $R^{11}$ and $R^{12}$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3$, $R^4$, $R^5$, $R^6$, $R^9$, $R^{10}$, $R^{11}$ and $R^{12}$ represents a substituted or unsubstituted aryl group or a substituted or unsubstituted heteroaryl group: $m^1$ represents 0 or 1; $m^2$ represents 0 or 1; $m^3$ represents 0 or 1; $L^1$, $L^2$, $L^3$, $L^4$, $L^5$, $L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1$, $L^2$, $L^3$, $L^4$, $L^5$, $L^6$ and $L^7$ is a substituted methine group, and $R^4$ and $R^{10}$ each represents a sulfo group; M represents a hydrogen atom, a metal or a quaternary ammonium salt; and n represents an integer of 1 to 7 required to neutralize charge, wherein $X^1$ a group represented by the following formula (i):

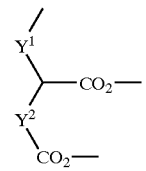

wherein $Y^1$ and $Y^2$ each independently represent a substituted or unsubstituted divalent bridging group.

6. A compound represented by the following formula (II) or a salt thereof:

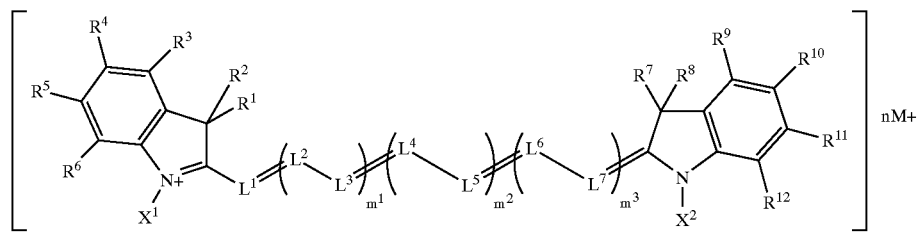

wherein $R^1$, $R^2$, $R^7$ and $R^8$ each independently represent a substituted or unsubstituted alkyl group having 1 to 10 carbon atoms or a substituted or unsubstituted aryl group, and $R^1$ and $R^2$ and/or $R^7$ and $R^8$ may bind to each other to form a ring; $R^3$, $R^4$, $R^5$, $R^6$, $R^9$, $R^{10}$, $R^{11}$ and $R^{12}$ each independently represent hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl group or sulfo group, and $R^3, R^4, R^5, R^6, R^9, R^{10}, R^{11}$ and $R^{12}$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3, R^4, R^5, R^6, R^9, R^{10}, R^{11}$ and $R^{12}$ represents a substituted or unsubstituted aryl group or a substituted or unsubstituted heteroaryl group; $m^1$ represents 0 or 1; $m^2$ represents 0 or 1; $m^3$ represents 0 or 1: $L^1, L^2, L^3, L^4, L^5, L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1, L^2, L^3, L^4, L^5, L^6$ and $L^7$ is a substituted methine group, and $R^4$ and $R^{10}$ each represents a sulfo group; M represents a hydrogen atom, a metal or a quaternary ammonium salt; and n represents an integer of 1 to 7 required to neutralize charge, wherein $X^1$ and $X^2$ each independently represent a group represented by the following formula (i):

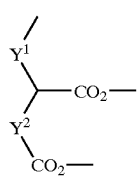

wherein $Y^1$ and $Y^2$ each independently represent a substituted or unsubstituted divalent bridging group.

7. The compound or the salt thereof according to claim 6, wherein at least one of $R^3, R^4, R^5, R^6, R^9, R^{10}, R^{11}$ and $R^{12}$ represents a substituted or unsubstituted aryl group or a substituted or unsubstituted heteroaryl group.

8. The compound or the salt thereof according to claim 4, wherein $X^1$ and $X^2$ each independently represent a carboxyalkyl group having 1 to 5 carbon atoms or a sulfoalkyl group having 1 to 5 carbon atoms, and at least one of $R^3, R^4, R^5, R^6, R^9, R^{10}, R^{11}$ and $R^{12}$ represents a substituted or unsubstituted aryl group or a substituted or unsubstituted heteroaryl group.

9. A compound represented by the following formula (II) or a salt thereof:

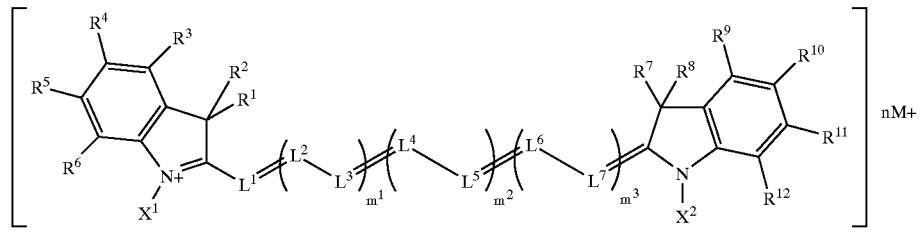

wherein $R^1, R^2, R^7$ and $R^8$ each independently represent a substituted or unsubstituted alkyl group having 1 to 10 carbon atoms or a substituted or unsubstituted aryl group, and $R^1$ and $R^2$ and/or $R^7$ and $R^8$ may bind to each other to form a ring; $R^3, R^4, R^5, R^6, R^9, R^{10}, R^{11}$ and $R^{12}$ each independently represent a hydrogen atom, a substituted or unsubstituted alkyl group having 1 to 6 carbon atoms, a substituted or unsubstituted aryl group, a substituted or unsubstituted heteroaryl group, a halogen atom, cyano group, carboxyl groin or sulfo group, and $R^3, R^4, R^5, R^6, R^9, R^{10}, R^{11}$ and $R^{12}$ may bind to each other to form a ring; $X^1$ and $X^2$ each independently represent a substituted or unsubstituted alkyl group having 1 to 15 carbon atoms or a substituted or unsubstituted aryl group, and the total number of carboxyl groups existing in $X^1$ and $X^2$ is four or less, provided when the total number of carboxyl groups existing in $X^1$ and $X^2$ is 0 or 1, $X^1$ and $X^2$ each independently represent a carboxyalkyl group having 1 to 5 carbon atoms or a sulfoalkyl group having 1 to 5 carbon atoms, and at least one of $R^3, R^4, R^5, R^6, R^9, R^{10}, R^{11}$ and $R^{12}$ represents a substituted or unsubstituted aryl group or a substituted or unsubstituted heteroaryl group; $m^1$ represents 0 or 1; $m^2$ represents 0 or 1; $m^3$ represents 0 or 1; $L^1, L^2, L^3, L^4, L^5, L^6$ and $L^7$ each independently represent a substituted or unsubstituted methine group, and when two or more methine groups among the methine groups have a substituent, these substituents may bind to each other to form a ring, provided when $X^1$ and $X^2$ each have one carboxyl group, at least one methine group selected from the group consisting of $L^1, L^2, L^3, L^4, L^5, L^6$ and $L^7$ is a substituted methine group, and $R^4$ and $R^{10}$ each represents a sulfo group; M represents a hydrogen atom, a metal or a quaternary ammonium salt; and n represents an integer of 1 to 7 required to neutralize charge, wherein $X^1$ and $X^2$ each independently represent a group represented by the following formula:

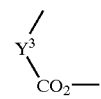

wherein $Y^3$ represents a hydrocarbon group having 1 to 10 carbon atoms, at least one methine group selected from the group consisting of $L^1, L^2, L^3, L^4, L^5, L^6$ and $L^7$ is a substituted methine group, and $R^4$ and $R^{10}$ each represents a sulfo group.

* * * * *